US009300901B2

(12) United States Patent
Grundhofer et al.

(10) Patent No.: US 9,300,901 B2
(45) Date of Patent: Mar. 29, 2016

(54) AUGMENTING PHYSICAL APPEARANCE USING ILLUMINATION

(71) Applicant: Disney Enterprises, Inc., Burbank, CA (US)

(72) Inventors: Anselm Grundhofer, Greifensee (CH); Amit Bermano, Uster (CH); Bernd Bickel, Zurich (CH); Philipp Bruschweiler, Amriswil (CH); Markus Gross, Zurich (CH); Daisuke Iwai, Mino (JP)

(73) Assignee: DISNEY ENTERPRISES, INC., Burbank, CA (US)

(*) Notice: Subject to any disclaimer, the term of this patent is extended or adjusted under 35 U.S.C. 154(b) by 146 days.

(21) Appl. No.: 14/096,364

(22) Filed: Dec. 4, 2013

(65) Prior Publication Data
US 2015/0154783 A1 Jun. 4, 2015

(51) Int. Cl.
G06T 15/00 (2011.01)
H04N 5/74 (2006.01)
G03B 21/00 (2006.01)
G06T 13/80 (2011.01)
G06T 19/00 (2011.01)
H04N 9/31 (2006.01)

(52) U.S. Cl.
CPC .............. *H04N 5/7458* (2013.01); *G03B 21/00* (2013.01); *G06T 13/80* (2013.01); *G06T 19/006* (2013.01); *H04N 9/3147* (2013.01); *H04N 9/3185* (2013.01); *H04N 9/3194* (2013.01); *G06T 2210/62* (2013.01)

(58) Field of Classification Search
CPC ................. G06T 5/003; G06T 19/006; G06T 2207/20208; G06T 2210/62; G06T 13/80; H04N 5/7458; G03B 21/00
USPC ........... 345/419, 426, 473, 633, 582; 348/745
See application file for complete search history.

(56) References Cited

PUBLICATIONS

Bernado et al (Augmenting Physical Avatars using Projector-Based Illumination, ACM Transaction on Graphics, vol. 32, No. 6, Article 189, pp. 189:1-189:10, Nov. 2013.*
Nagase et al, Dynamic defocus and occlusion compensation of projected imagery by model-based optimal projector selection in multi-projection environment, Virtual Real 15, 2-3, 2011, pp. 119-132.*
Aliaga, Daniel G. et al., "Fast High-Resolution Appearance Editing Using Superimposed Projections", ACM Trans. Graph., 31, 2, 13:1-13:13, Apr. 2012.

(Continued)

*Primary Examiner* — Phu K Nguyen
(74) *Attorney, Agent, or Firm* — Dorsey & Whitney LLP

(57) ABSTRACT

A system for augmenting the appearance of an object including a plurality of projectors. Each projector includes a light source and a lens in optical communication with the light source, where the lens focuses light emitted by the light source on the object. The system also includes a computer in communication with the plurality of projectors, the computer including a memory component and a processing element in communication with the memory component and the plurality of projectors. The processing element determines a plurality of images to create an augmented appearance of the object and provides the plurality of images to the plurality of projectors to project light corresponding to the plurality of images onto the object to create the augmented appearance of the object. After the images are projected onto the object, the augmented appearance of the objected is substantially the same regardless of a viewing angle for the object.

11 Claims, 22 Drawing Sheets

(56) References Cited

PUBLICATIONS

Lincoln, Peter et al., "Animatronic Shader Lamps Avatars", In Proc. Int. Symposium on Mixed and Augmented Reality, The University of North Carolina at Chapel Hill, Department of Computer Science, 7 pages, 2009.

Misawa, K. et al., "Ma petite cherie: What are you looking at? A Small Telepresence System to Support Remote Collaborative Work for Intimate Communication", In Proc. Augmented Human International Conference, ACM, New York, NY, USA, AH 2012, 17:1-17:5.

Moubayed, Samer A. et al., "Taming Mona Lisa: Communicating Gaze Faithfully in 2D and 3D Facial Projections", ACM Transactions on Interactive Intelligent Systems, vol. 1, No. 2, Article 11, Jan. 2012.

\* cited by examiner

AUGMENTING PHYSICAL APPEARANCE USING ILLUMINATION

FIELD

The present invention relates generally to varying the appearance of a component, such as a physical structure or avatar, using illumination.

BACKGROUND

Animated animatronic figures, such as avatars, are a unique way to give physical presence to a character. For example, many animatronic figures are movable and can be used as part of an interactive display for people at a theme park, where the figures may have articulable elements that move, and may be used in conjunction with audio to simulate the figure talking or making other sounds. However, typically the movement and/or expressions of the figures may be limited due to mechanical constraints. As an example, in animatronic figures representing human faces certain expressions, such as happiness, fear, sadness, etc. may be desired to be replicated by the figures. These facial expressions may be created by using actuators that pull an exterior surface corresponding to the skin of the figure in one or more directions. The precision, number, and control of actuators that are required to accurately represent details such as dimples, wrinkles, and so on, may be cost-prohibitive, require space within the head of the figures, and/or require extensive control systems.

It is with these shortcomings in mind that the present invention has been developed.

SUMMARY

One embodiment of the present disclosure may take the form of a system for augmenting the appearance of an object including a plurality of projectors. Each projector includes a light source and a lens in optical communication with the light source, where the lens focuses light emitted by the light source on the object. The system also includes a computer in communication with the plurality of projectors, the computer including a memory component and a processing element in communication with the memory component and the plurality of projectors. The processing element determines a plurality of images to create an augmented appearance of the object and provides the plurality of images to the plurality of projectors to project light corresponding to the plurality of images onto the object to create the augmented appearance of the object. After the images are projected onto the object, the augmented appearance of the objected is substantially the same regardless of a viewing angle for the object.

Another embodiment of the disclosure may take the form a system for modifying the appearance of an avatar to correspond to a target appearance, where the target appearance includes high frequency details and low frequency details. The system includes a mechanically moveable avatar, a first projector in optical communication with the moveable avatar and configured to project a first image onto a first section of the avatar, a second project in optical communication with the moveable avatar and configured to project a second image onto a second section of the avatar. In the system, the low frequency details of the target appearance are replicated by mechanical movement of the avatar, the high frequency details of the target appearance are replicated by the first and second images projected onto the avatar, and the combination of the low frequency details and the low frequency details replicate the target appearance onto the avatar.

Yet another embodiment of the disclosure may take the form of a method for projecting images using two or more projectors onto a three-dimensional surface to alter the appearance of the three-dimensional surface. The method includes modeling a defocus of each projector of the two or more projectors, determining the light transport of the three-dimensional surface, detecting discontinuous regions on the three-dimensional surface by using a computer to analyze a three-dimensional mesh corresponding to the three-dimensional surface, adjusting by the computer a first input image and a second input image to create a first modified image and a second modified image based on the defocus of each projector, the light transport of the three-dimensional surface, and an intensity of the first input image and the second input image at a location of the discontinuous regions, and projecting the first modified image and the second modified image onto the three-dimensional surface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SPECIFICATION

Overview

Figure 1A:
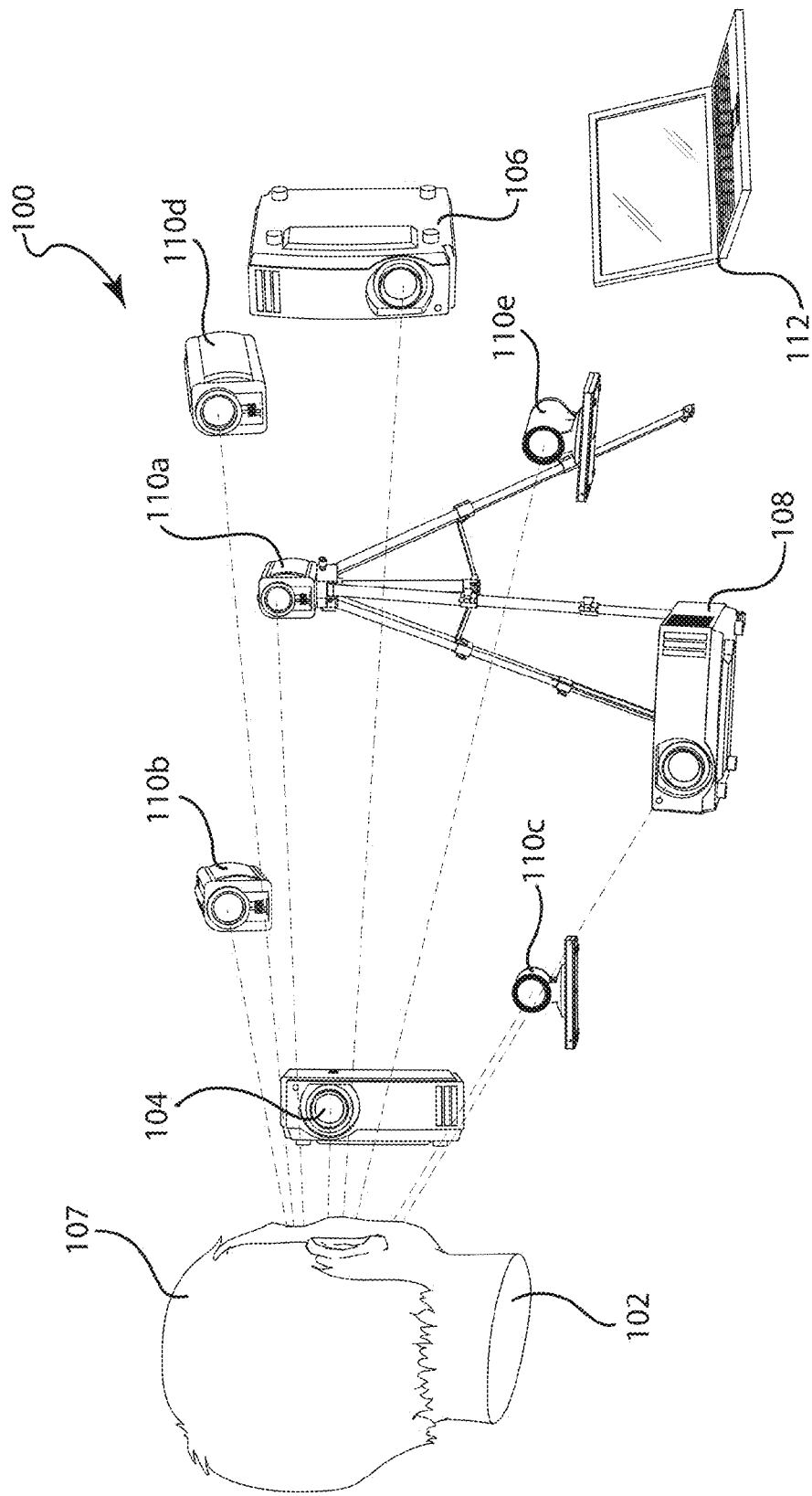
FIG. 1A is a perspective view of a system for augmenting the appearance of an avatar.

The present disclosure is related to embodiments that increase the expressiveness of animatronic figures without requiring the avatar to include additional or more sensitive actuators or be able to move in an increased number or complexity of movements. In one embodiment, the system includes a mechanically movable avatar and two or more projectors that display images on the avatar. The avatar (or portion of the avatar, such as a head) may include a deformable skin attached to an articulating structure. The articulating structure is operably connected to one or more motors or actuators that drive the articulating structure to introduce movement. The two or more projectors display images onto the skin to introduce high frequency details, such as texture, skin coloring, detailed movements, and other elements or characteristics that may be difficult (or impossible) to create with the articulating structure and skin alone. In these embodiments, low-frequency motions for the avatar are reproduced by the articulating structure and the high-frequency details and subtle motions are emulated by the projectors in the texture space. As used herein the term low-frequency details or motion is meant to encompass motion that can be reproduced by the physical movements of the avatar and the term high frequency details ore motion is meant to encompass motion and detail that cannot be physically reproduced accurately by the physical movements of the avatar. The projected images are configured to correspond to the physical movements of the avatar to create an integrated appearance and movements that can accurately recreate a target input (e.g., a desired performance for the avatar).

In one example, a target performance is created and mapped to the avatar. The target performance may be captured from a person (e.g., actor animating a desired target performance), animal, component, or the target performance may be a programmed response, such as an input geometry. After the target performance is created, the performance is translated to match the desired avatar. In one implementation, the target performance is mapped to a mesh sequence and the mesh sequence is fitted to the avatar. For example, the target performance is reconstructed as a target mesh which is fitted to the avatar. Fitting the target mesh to the avatar may be done by finite-element based optimization of the parameters controlling the skin actuation (e.g., actuators) of the avatar.

The avatar is then positioned in the field of view of one or more cameras and projectors. The cameras are configured to capture structured light projected by the projectors to facilitate calibration of the cameras and projectors, the cameras may also be used to assist in the three-dimensional reconstruction of the avatar. The avatar mesh sequence is registered to the target mesh sequence so that the characteristics of the target performance that cannot be physically actuated by the avatar are extracted. In other words, the avatar is evaluated to determine the portions of the target performance that can be physically executed by the avatar, as well as determine those portions that cannot be physically executed or that may be executed at a lower resolution than desired.

The portions of the target performance, such as select mesh sequences representing movements, skin colors, shadow effects, textures, or the like, that cannot be represented in a desired manner by the physical movements of the avatar itself, are mapped to corresponding color values that can be projected as images onto the avatar. For example, certain light colors may be projected onto select vertices within the mesh to change the appearance of the skin in order to match the target performance.

In some examples, the projector includes a plurality of projectors that each display images onto the avatar. The system is configured such that the images from each projector blend substantially seamlessly together, reducing or eliminating image artifacts. By blending together images from multiple projectors, the avatar may appear to have a uniform appearance regardless of the viewing angle, i.e., the appearance of the avatar is viewpoint-independent. In conventional systems that project images onto objects, a single projector is used and the image is typically configured based on a predetermined viewing angle and as such when the object is viewed from other angles the appearance of the object varies. By removing the viewpoint dependency from the avatar, the user is provided with a more realistic viewing experience as he or she can walk around the avatar and the appearance will remain substantially the same.

In some examples, the images corresponding to the high frequency details are adjusted to account for defocus of the projectors. Defocus causes the one or more pixels projected by the projector to go out of focus and can be due to projector properties such as lens aberration, coma and optical defocus, as well as properties of the surface such as subsurface scattering. Adjusting the images to account for defocusing allows the images to be sharper and less blurred, which allows the modified images to be calibrated to more accurately represent the target performance.

Additionally, in some embodiments, the skin of the avatar may be translucent or partially translucent. In these embodiments, the images projected onto the avatar are compensated to adjust for defocus and subsurface scattering of light beneath the skin. In particular, the images may be over-focused at projection to adjust for the defocusing that can occur as the light hits the skin and scatters beneath the surface, which reduces burring in the images.

In embodiments where the images are adjusted to compensate for subsurface scattering and/or projector defocus, the adjustments include weighting the images projected by the remaining projectors. This allows the system to take into account that a number of locations on the avatar are illuminated by two or more projectors and thus pixels projected by one projector are not only influenced by other pixels projected by that projector but also pixels projected by other projectors. As an example, the subsurface scattering is evaluated at any point and takes into account the light from each of the projectors to determine how each point is affected by the plurality of light sources.

It should be noted that the techniques described herein regarding using projected images to shade and texture a three-dimensional surface, such as an avatar, may be used in a variety of applications separate from animatronics or avatars. In particular, adjusting an image based on subsurface scattering and defocus may be applied in many applications where images are projected onto a surface, object, or the like. As such, although the description of these techniques may be described herein with respect to avatars and other animatronic characters, the description is meant as illustrative and not intended to be limiting.

DETAILED DESCRIPTION

Figure 1B:
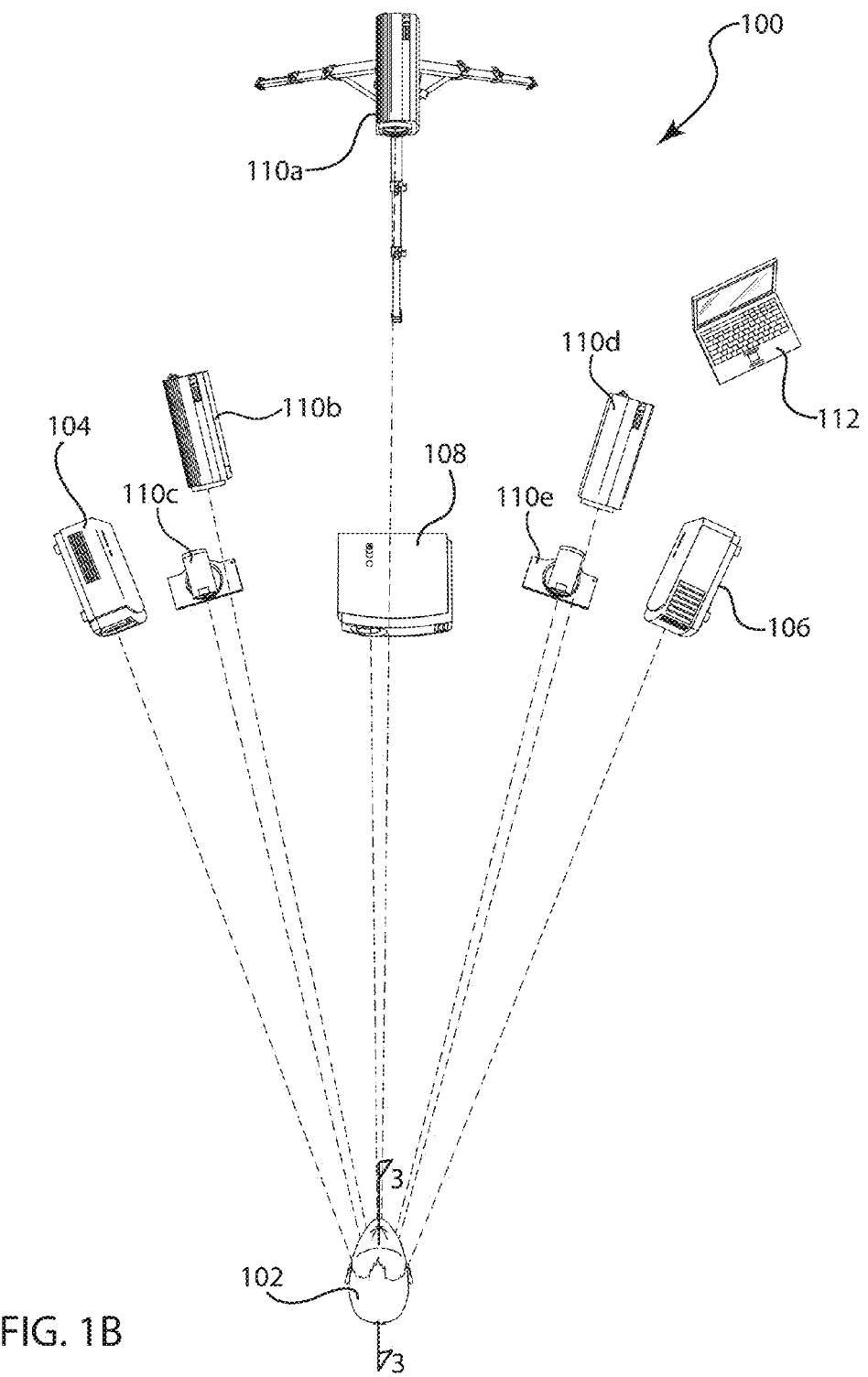
FIG. 1B is a top plan view of the system of FIG. 1A.
Figure 1C:
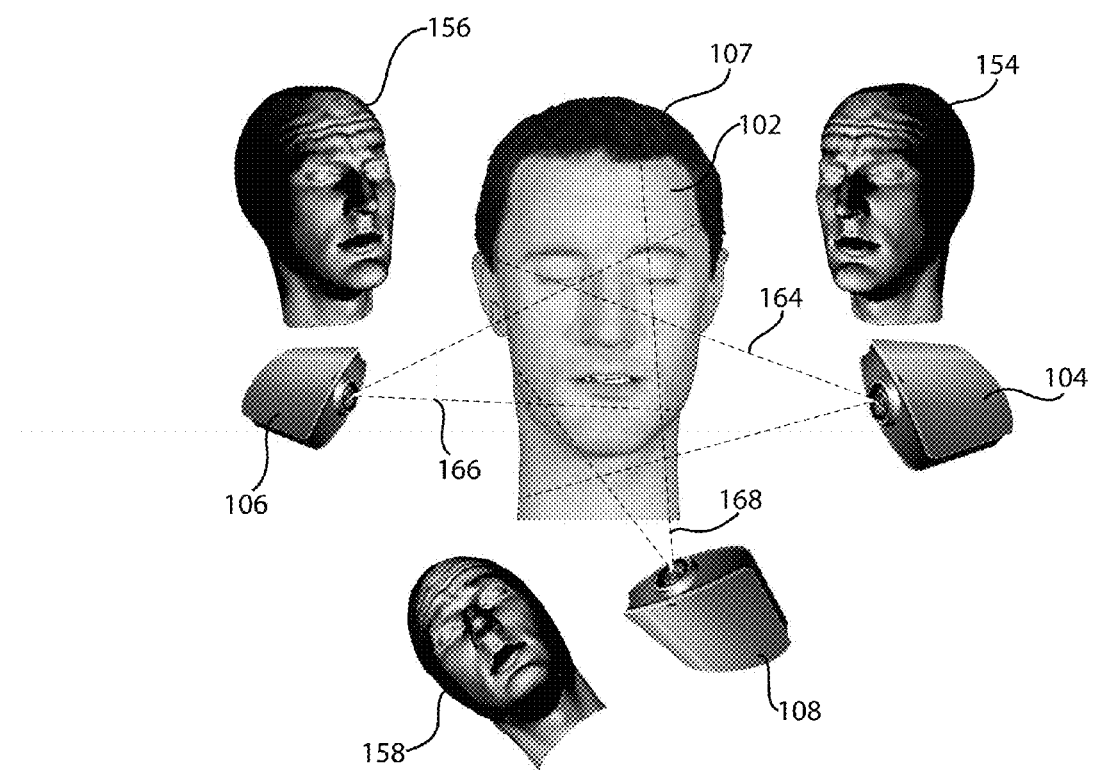
FIG. 1C is a simplified front elevation view of the system of FIG. 1A illustrating a display field for a plurality of projectors they project onto the avatar and examples of the projected images projected by each projector.

Turning now to the figures, a system for augmenting a physical avatar will be discussed in more detail. FIG. 1A is a perspective view of a system 100 including an avatar 102, a plurality of projectors 104, 106, 108, a plurality of cameras 110a, 110b, 110c, 110d, 110e, and a computer 112. FIG. 1B is a top plan view of the system 100 of FIG. 1A. FIG. 1C is a simplified front elevation view illustrating the display field 164, 166, 168 for each of the projectors as they project onto the avatar and showing examples of the images 154, 156, 158 as they are projected onto the avatar 102. The various components of the system 100 may be used in combination to replicate a desired animation or performance for the avatar.

The computer 112 may be used to control the avatar 110, the projectors 104, 106, 108, as well as modifying the images projected by the projectors. The projectors 104, 106, 108 are used to display images corresponding to textures, shading, and movement details onto the avatar 100. The cameras 110a, 110b, 110c, 110d, 110e are used to capture the visual performance of the avatar and provide feedback to the computer to determine if the images projected onto the avatar have the desired effect. In some embodiments the cameras can also be used to capture the physical avatar movements and appearance to produce a virtual performance of the avatar. It should be noted that in other embodiments, the target performance of the avatar may be preprogrammed (e.g., previously determined) and in these instances the feedback images may be omitted with at least one other type of input, such as a programming instructions or user input.

Additionally, although multiple cameras are illustrated in some instances the multiple cameras may be replaced by a single movable camera. For example, the camera may be able to move between two or more locations to capture images of the object from two or more locations.

Figure 2C:
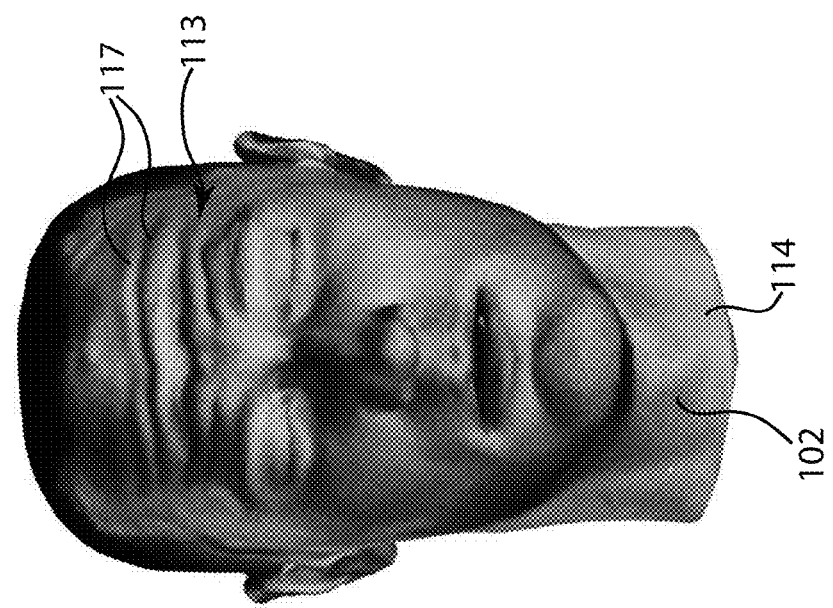
FIG. 2C is a front elevation view of the avatar with texture and shading provided by modifying images projected thereon.
Figure 2B:
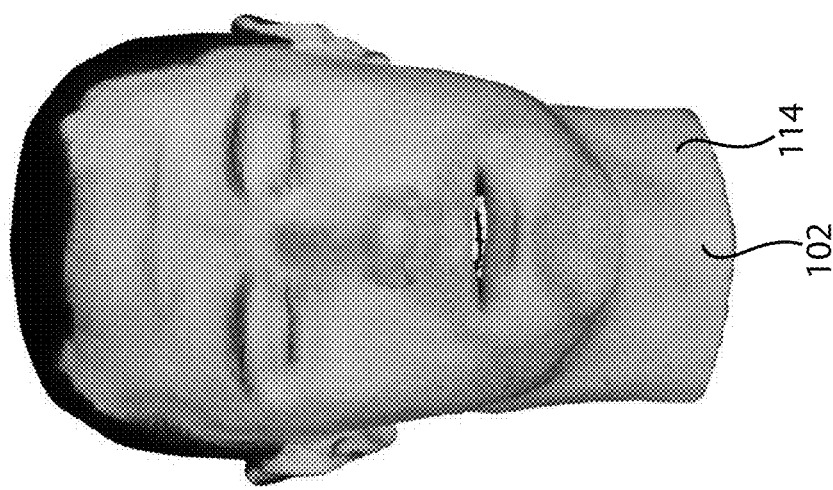
FIG. 2B is a front elevation view of the avatar under white illumination without modifying images projected thereon.
Figure 2A:
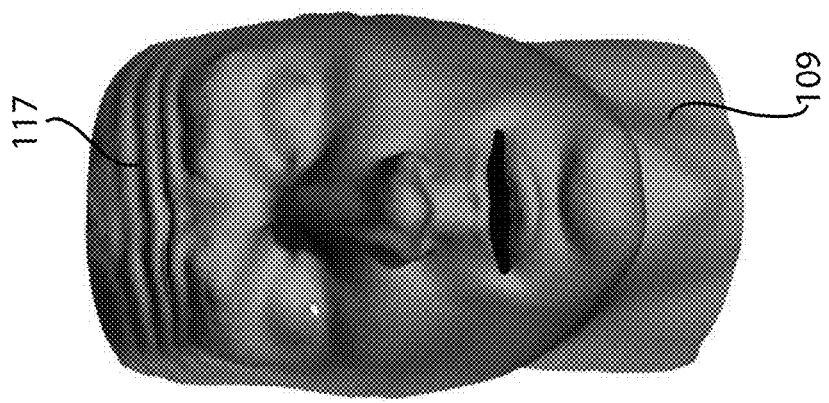
FIG. 2A is a front elevation view of a target performance or input geometry for replication by the avatar.

As shown in FIG. 1C, the projectors 104, 106, 108 project images 154, 156, 158 that correspond to shading, textures, and animations for the avatar 102, these images provide the high frequency details for the avatar 102. FIGS. 2A-2C illustrate a target performance being recreated by the avatar 102 and projectors 104, 106, 108. In particular, FIG. 2A illustrates a target performance 109 or input geometry to be replicated by the avatar 102. FIG. 2B illustrates the avatar 102 under white illumination without the images 154, 156, 158 being projected thereon. As shown in FIG. 2B, skin 114 of the avatar 102 has not been moved to replicate characteristics of the target performance 109. However, certain portions of the avatar 102 physically move (e.g., deform and/or articulate) to replicate the low frequency details, such as opening of the mouth. FIG. 2C illustrates the avatar 102 with defocus compensated projector shading provided by the images 154, 156, 158. As can be seen by comparing the avatar 102 in FIGS. 2B and 2C, the images 154, 156, 158 replicate the high frequency details of the target performance 109 that are not physically replicated by the avatar 102 itself. The combination of the low frequency details and the high frequency details as replicated by the avatar and the images projected onto the avatar replicate the target performance 109. In this manner, the system 100 provides a more realistic replication of the target performance 109 than might otherwise be possible by the avatar 102 alone. Further, because there are a plurality of projectors 104, 106, 108 projecting the images 154, 156, 158 from a variety of angles (see FIG. 1C), the avatar 102 has a substantially constant appearance regardless of the viewing angle of a user.

With reference again to FIGS. 1A-1C, each of the components of the system 100 will be discussed, in turn, below.

Figure 3:
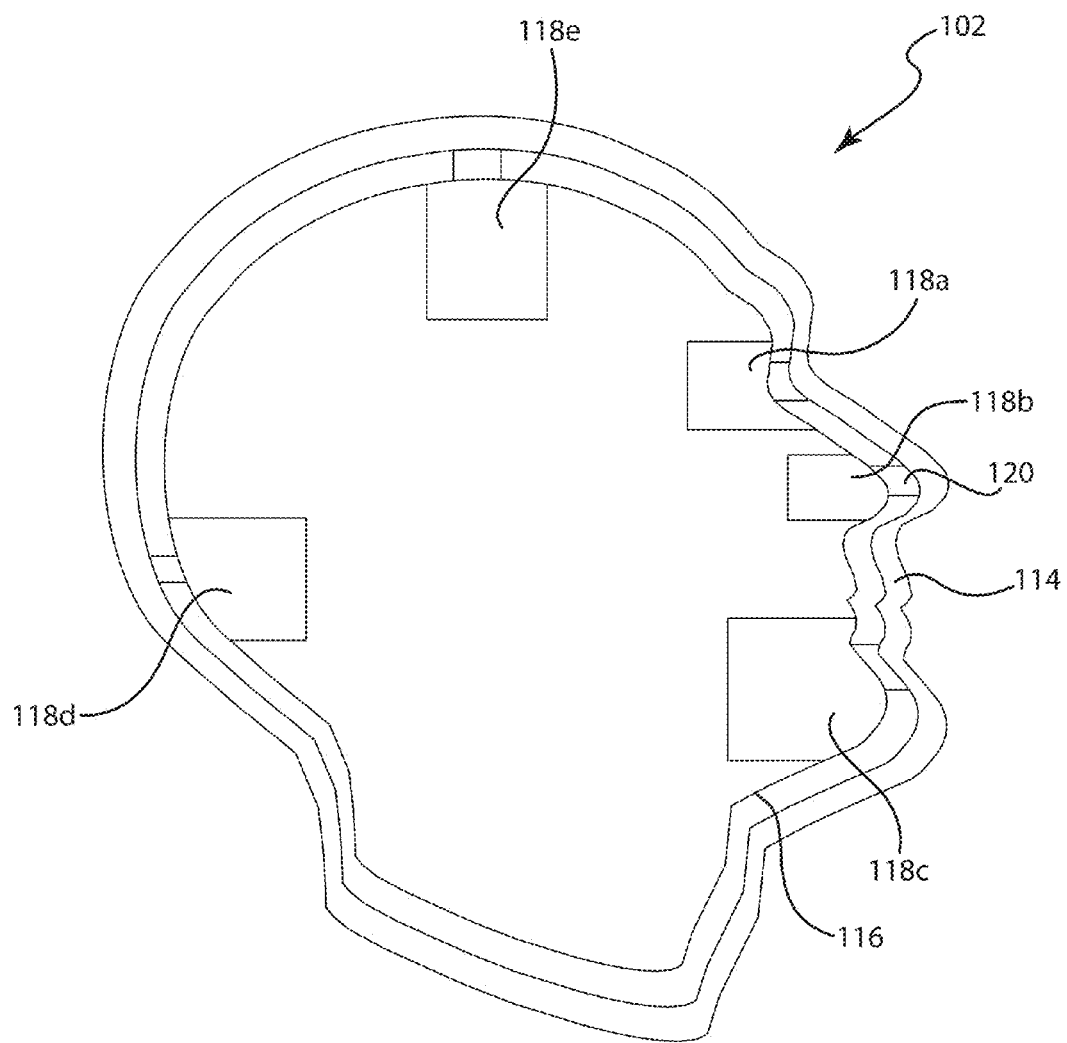
FIG. 3 is a simplified cross-section view of the avatar taken along line 3-3 in FIG. 1B.

The avatar 102 is shown in FIGS. 1A-2C as a portion of a human face; however it should be noted that the techniques described herein may be used with many other animatronic figures, as well as other surfaces or objects where a variable appearance may be desired may also be used. FIG. 3 is a simplified cross-section view of the avatar 100 taken along line 2-2 in FIG. 1. With reference to FIG. 3, the avatar 102 may include an exterior surface, such as a skin 114 that is supported on a frame 116 or other structure. The skin 114 can be a variety of different materials that are deformable, resilient, and/or flexible. In one example, the skin 114 is silicone or another elastomeric material and is translucent or partially translucent and/or can be dyed or otherwise configured to match a desired appearance. In some instances hair, fur, or other features may be attached to the skin 114. As shown in FIGS. 1A-2C, the avatar 102 includes hair 107 on a top portion of its head, but depending on the type of character the avatar 102 is meant to replicate hair, fur, feathers, or the like can be attached over large portions of the avatar 102.

The skin 114 and/or frame 116 are typically movable to allow the avatar 102 to be animated. For example, the avatar 102 may include one or more actuators 118a, 118b, 118c, 118d, 118e, such as motors or other electro-mechanical elements, which selectively move portions of the frame 116 and/or skin. As shown in FIG. 2 the actuators 118a, 118b, 118c, 118d, 118e are operably connected at various locations 120 to the skin 114, allowing the actuators 118a, 118b, 118c, 118d, 118e to pull, push, or otherwise move the skin 114 at those locations 120. Additionally, the actuators 118a, 118b, 118c, 118d, 118e are configured to articulate the frame 116. As an example, the avatar 102 can include one or more appendages (such as arms or legs) where the frame 116 is movable as well as the skin. Alternatively or additionally, certain features, e.g., lips, ears, or the like of the avatar 102 may also include a movable frame that moves along with or separate from the actuation of the skin 114.

With continued reference to FIG. 3, the actuators 118a, 118b, 118c, 118d, 118e selectively move portions of the skin 114 to create a desired animation. The actuators 118a, 118b, 118c, 118d, 118e in some examples are configured to recreate low-frequency movements of a desired target performance or animation. For example, the actuators 118a, 118b, 118c, 118d, 118e can be configured to move the avatar's lips, eyebrows, or the like.

It should be noted that the system 100 is configurable to apply texture, lighting, and other characteristics to a variety of three-dimensional objects and the specific mechanical components of the animatronic 102 illustrated in FIGS. 1A-2C are meant as illustrative only. For example, some three-dimensional objects using the texturing and lighting techniques described herein may not be movable or may not represent avatars but represent inanimate objects.

With reference again to FIGS. 1A-1C the system 100 includes a plurality of projectors 104, 106, 108 and cameras 110a, 110b, 110c, 110d, 110e. In some embodiments one or more components of the projectors and the cameras may be combined together or as shown in FIGS. 1A and 1B, the cameras and the projectors may be separated from one another. In the example in FIGS. 1A-1C, each of the cameras 110a, 110b, 110c, 110d, 110e and the projectors 104, 106, 108 are spatially separated from each other. For example a first projector 104 and a second projector 106 are positioned above the third projector 108 and the third projector 108 is positioned horizontally between the first and second projectors 104, 106. In this manner, each projector 104, 106, 108 projects images 154, 156, 158 onto different, and optionally overlapping, areas of the avatar 102. As shown in FIG. 1C, each of the projectors 104, 106, 108 has a display field 164, 166, 168 that overlaps portions of the display field of the other projectors, such that the entire outer surface of the avatar, or a substantially portion thereof, receives light from one of the projectors. As will be discussed in more detail below, the images 154, 156, 156 are adjusted to compensate for the overlapping display fields 164, 166, 168.

Although three projectors 104, 106, 108 are illustrated in FIGS. 1A-1C, the number of projectors and their placement can be varied as desired. Similarly, the cameras 110a, 110b, 110c, 110d, 110e are horizontally and vertically separated from one another to capture different angles and surfaces of the avatar 102. In some instances the cameras 110a, 110b, 110c, 110d, 110e may be poisoned around the avatar 102 based on predicted viewing angles of users for the avatar 102, such that the cameras can capture images of the avatar that may be similar to those views that a user may experience while viewing the avatar 102 (either virtually or physically).

Figure 4A:
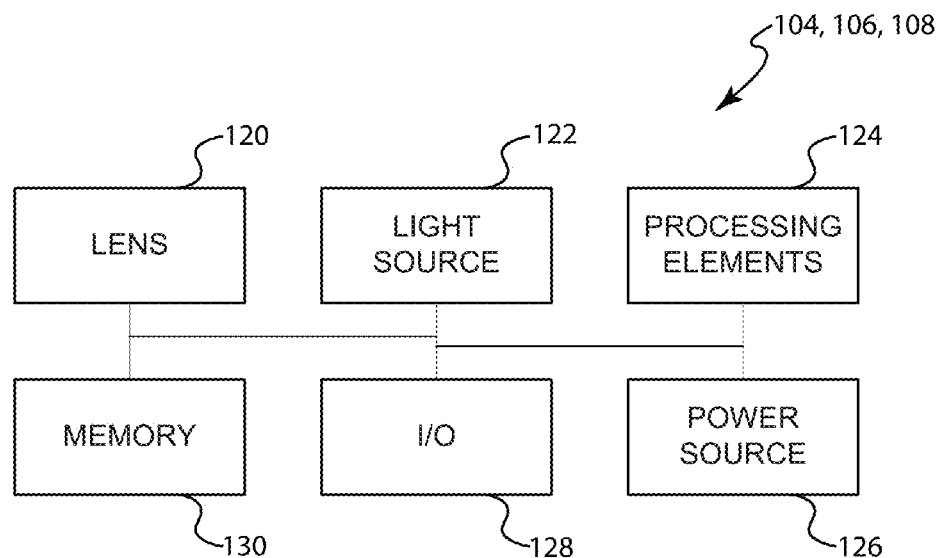
FIG. 4A is a simplified block diagram of an illustrative projector that can be used with the system of FIG. 1A.

The projector may be substantially any device configured to project and spatially control light. A simplified block diagram of an illustrative projector for the system 100 will now be discussed. FIG. 4A is a block diagram of the projectors 104, 106, 108. In some examples the projectors 104, 106, 108 may be substantially the same as another and in other examples the projectors 104, 106, 108 may be different from one another. With reference to FIG. 4A, each of the projectors 104, 106, 108 may include a lens 120, a light source 122, one or more processing elements 124, one or more memory components 130, an input/output interface 128, and a power source 126. The processing element 124 may be substantially any electronic device cable of processing, receiving, and/or transmitting instructions. The memory 130 stores electronic data that is used by the projector 104, 106, 108. The input/output interface 128 provided communication to and from the projectors 104, 106, 108 to the computer 112, as well as other devices. The input/output interface 128 can include one or more input buttons, a communication interface, such as WiFi, Ethernet, or the like, as well as other communication components such as universal serial bus (USB) cables, or the like. The power source 126 may be a battery, power cord, or other element configured to transmit power to the components of the projectors.

The light source 122 is any type of light emitting element, such as, but not limited to, one or more light emitting diodes (LED), incandescent bulbs, halogen lights, liquid crystal displays, laser diodes, or the like. The lens 120 is in optical communication with the light source and transmits light from the source 122 to a desired destination, in this case, one or more surfaces of the avatar 102. The lens 122 varies one more parameters to affect the light, such as focusing the light at a particular distance. However, in some instances, such as when the projector is a laser projector, the lens may be omitted.

Figure 4B:
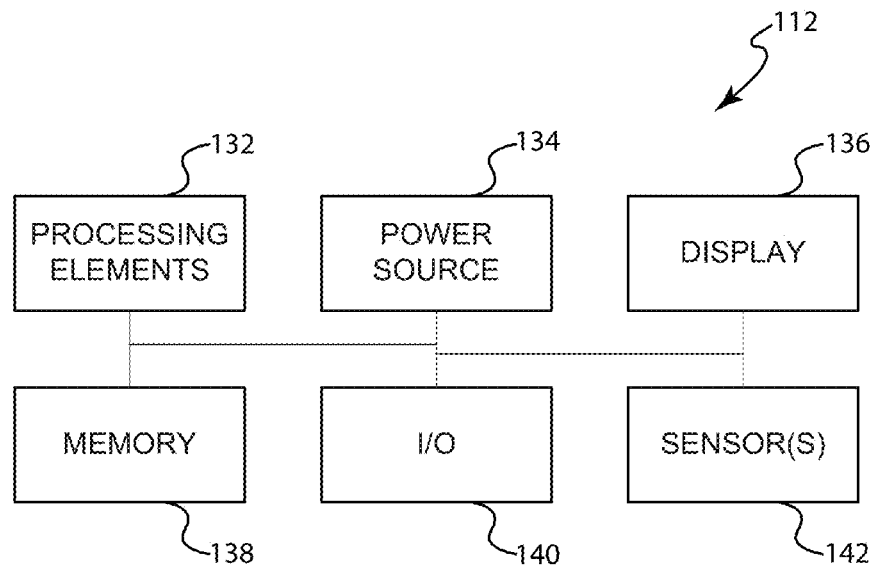
FIG. 4B is a simplified block diagram of a computer that can be used with the system of FIG. 1A.

As shown in FIGS. 1A and 1B, the one or more cameras 110a, 110b, 110c, 110d, 110e and projectors 104, 106, 108 are in communication with one or more computers 112. In the example shown in FIGS. 1A and 1B, only one computer 112 is shown, but it should be noted that two or more computers may also be used. FIG. 4B is a simplified block diagram of the computer 112. With reference to FIG. 4, the computer 112 may include one or more processing elements 132 that are capable of processing, receiving, and/or transmitting instructions. For example, the processing elements 132 may be a microprocessor or microcomputer. Additionally, it should be noted that select components of the computer 112 may be controlled by a first processor and other components may be controlled by a second processor, where the first and second processors may or may not be in communication with each other.

The computer 112 may also include memory 138, such as one or more components that store electronic data utilized by the computer 112. The memory 138 may store electrical data or content, such as, but not limited to, audio files, video files, document files, and so on, corresponding to various applications. The memory 138 may be, for example, magneto-optical storage, read only memory, random access memory, erasable programmable memory, flash member, or a combination of one or more types of memory components.

With continued reference to FIG. 4B, the computer 112 includes a power source 134 that provides power to the computing elements and an input/output interface 140. The input/output interface 140 provides a communication mechanism for the computer 112 to other devices, such as the cameras and/or projectors, as well as other components. For example, the input/output interface may include a wired, wireless, or other network or communication elements.

Optionally, the computer 112 can include or be in communication with a display 136 and have one or more sensors 142. The display 136 provides a visual output for the computer 112 and may also be used as a user input element (e.g., touch sensitive display). The sensors 142 include substantially any device capable of sensing a change in a characteristic or parameter and producing an electrical signal. The sensors 142 may be used in conjunction with the cameras, in replace of (e.g., image sensors connected to the computer), or may be used to sense other parameters such as ambient lighting surrounding the avatar 102 or the like. The sensors 142 and display 136 of the computer 112 can be varied as desired.

Figure 5A:
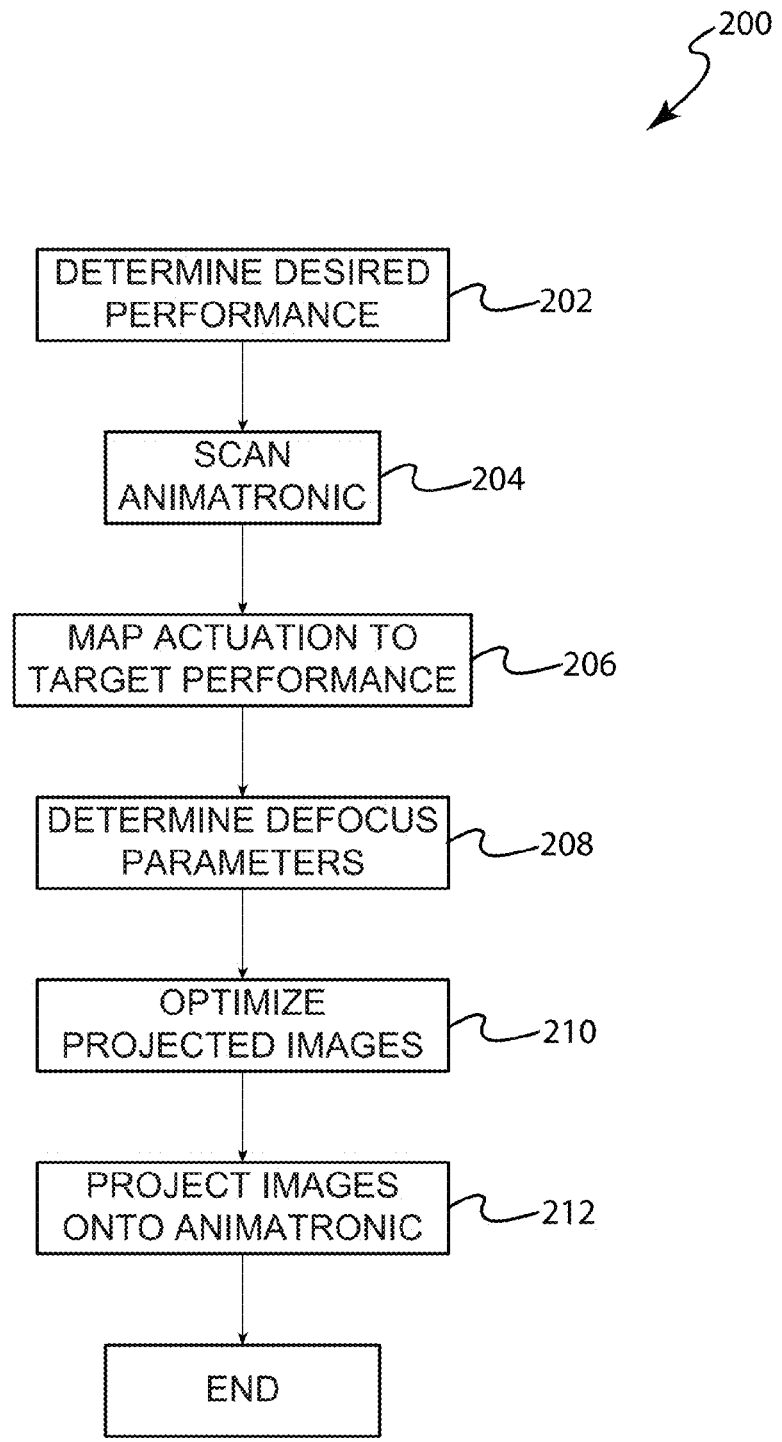
FIG. 5A is a flow chart illustrating a method for using the system of FIG. 1 to replicate the target performance of FIG. 2A onto the avatar.
Figure 5B:
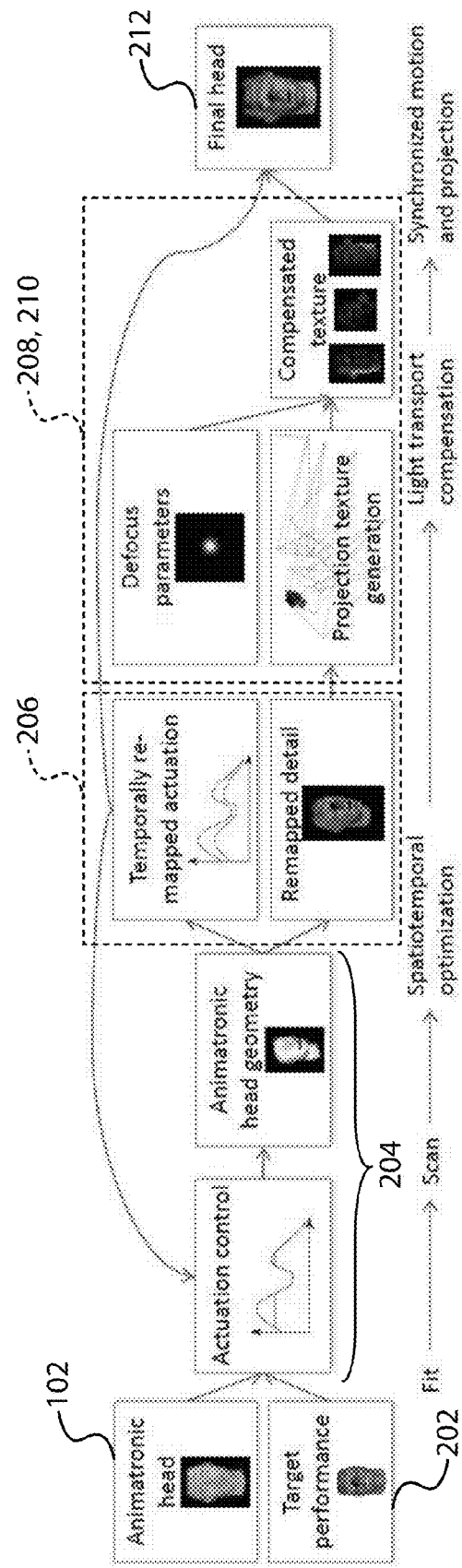
FIG. 5B is a block diagram illustrating the method of FIG. 5A.

A method for using the system 100 to create a desired appearance and/or performance for the avatar 102 will now be discussed in more detail. FIG. 5A is a flow chart illustrating a method for using the system 100 to replicate the target performance 109 with the avatar 102. FIG. 5B is a block diagram generally illustrating the method of FIG. 5A. With reference initially to FIG. 5A, the method 200 may begin with operation 202 and the target performance 109 is determined. This operation 202 may include capturing images or video of a person, character, or other physical element that is to be represented by the avatar 102. For example, a video of an actor moving, speaking, or the like, can be videotaped and translated into an input geometry for the target performance 109. Alternatively or additionally, operation 202 can include inputting through an animation, programming code, or other input mechanisms the target performance 109 of the avatar 102. It should be noted that the term target performance as used herein is meant to encompass a desired appearance of the avatar, as well as movements, changes in appearance, audio (e.g., speaking), or substantially any other modifiable parameter for the avatar 102. The target performance 109 forms an input to the system 100 and in some examples may be represented by a three-dimensional mesh sequence with temporal correspondence.

Once the target performance 109 is determined, the method 200 proceeds to operation 204. In operation 204, the avatar 102 is scanned or otherwise analyzed to create a three-dimensional representation of the physical structure of the avatar 102, as well as determine the movements of the target performance 109 that can be created physically by the avatar 102. In instances where the same avatar 102 is used repeatedly this operation may be omitted as the geometry and operational constraints may already be known.

Figure 6:
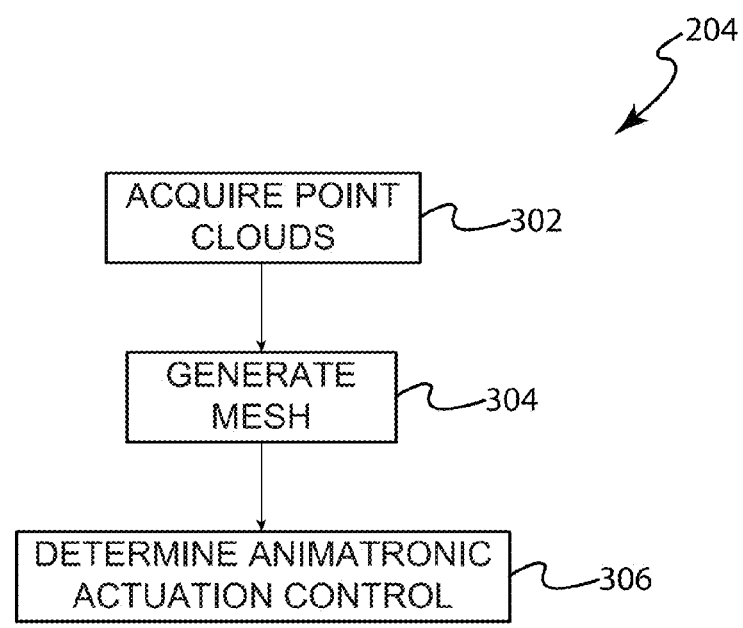
FIG. 6 is a flow chart illustrating a process for the scanning operation in the method of FIG. 5A.

Scanning the avatar 102, as in operation 204, includes acquiring the geometry of the avatar 102 or other object onto which the images from the projector are going to be projected. FIG. 6 is a flow chart illustrating the processes of operation 204 of FIG. 5A. With reference to FIG. 6, operation 204 may include process 302 where one or more point clouds are determined. This process 302 includes calibrating the cameras 110a, 110b, 110c, 110d, 110e and the projectors 104, 106, 108. As one example, the cameras 110a, 110b, 110c, 110d, 110e are geometrically calibrated using a checkerboard based calibration technique. For example, a series of structured light patterns, such as gray codes and binary blobs, can be used to create a sub-pixel accurate mapping from pixels of each of the cameras 110a, 110b, 110c, 110d, 110e to the pixels of the projectors 104, 106, 108. However, other calibration techniques are envisioned and in instances where the cameras are used repeatedly they may include known characteristics which can be taken into account and thus the calibration operation can be omitted.

Once the cameras 110a, 110b, 110c, 110d, 110e are geometrically calibrated, a medium resolution 3D point cloud $\mathcal{P}_n$ is generated by the computer 112 for each frame n=1 ... $\mathcal{N}$ of the target performance executed by the avatar 102. In other words, the cameras 110a, 110b, 110c, 110d, 110e capture a video of the avatar 102 while it is moving and the point cloud $\mathcal{P}_n$ is generated for each of the frames of the video. The projectors 104, 106, 108 can be calibrated using direct linear transformation with non-linear optimization and distortion estimation. To further optimize the 3D point clouds, as well as the calibration accuracy, and evenly distribute the remaining errors, a bundle adjustment can be used.

While the data provided by the one or more scans of the avatar 102 by the cameras 110a, 110b, 110c, 110d, 110e generally is accurate and represents the motion of the avatar 102, in some instances the scan can be incomplete both in terms of density and coverage. In particular, regions that are not visible to more than one camera 110a, 110b, 110c, 110d, 1103 (e.g., due to occlusion or field of view), may not be acquired at all, or may yield a sparse and less accurate distribution of samples. To adjust for these regions, additional cameras can be added to the system to ensure that all of the areas of the avatar 102 are captured. Alternatively or additionally, the cameras 110a, 110b, 110c, 110d, 110e scan the neutral pose of the avatar 102 (e.g., the pose prior to any actuator or skin movement), then a high quality scanner is used and the data is completed using a non-rigid registration that creates a mesh for the avatar 102.

Figure 7:
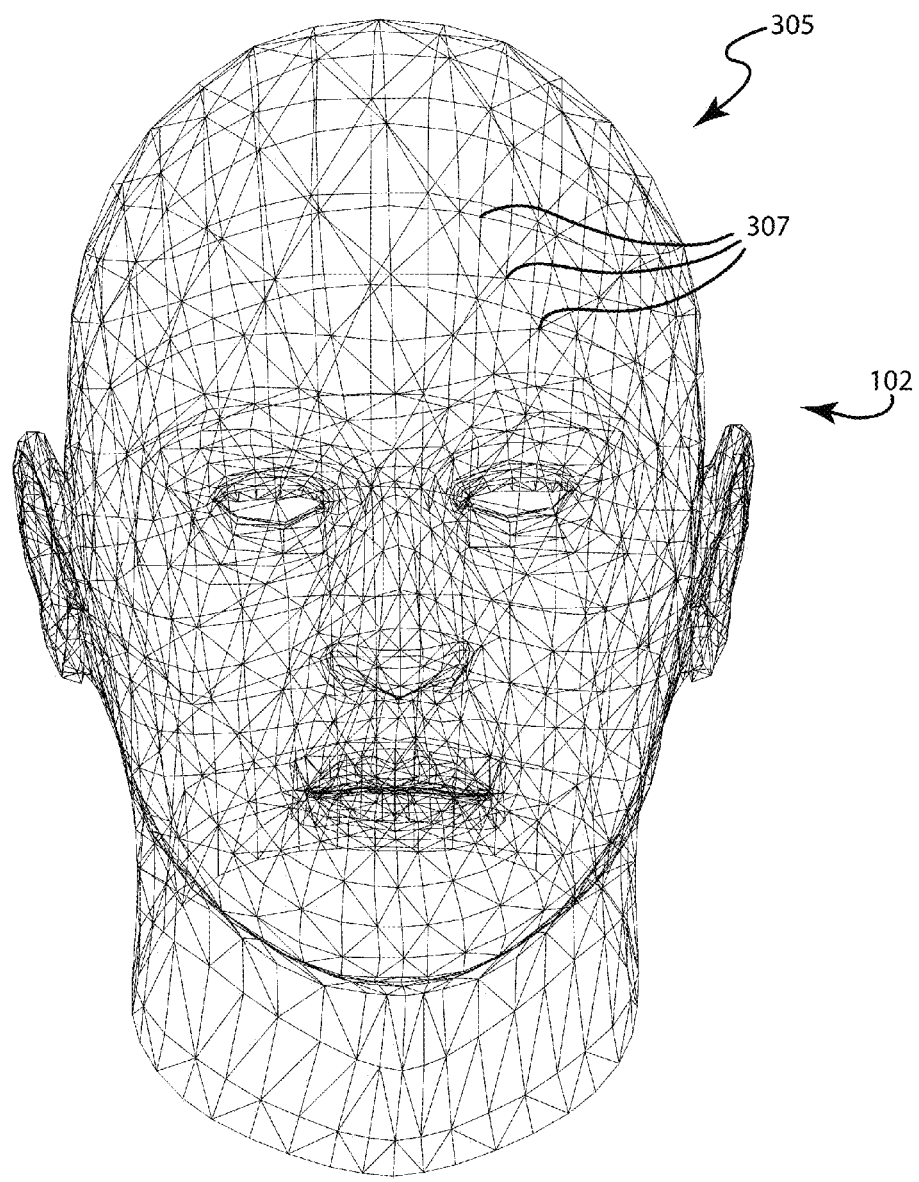
FIG. 7 is a front elevation view of an illustrative three-dimensional mesh corresponding to the avatar.

Once the point clouds for the frames of the video capturing the desired avatar performance are determined, the method 204 proceeds to process 304. In process 304, the computer 112 generates a mesh for the avatar 102. FIG. 7 is a front elevation view of an illustrative mesh 305 for the avatar 102 including a plurality of vertices 307. Given the acquired point-clouds $\mathcal{P}_n$, a mesh sequence $\mathcal{M}_n$ using the neutral scan pose of the avatar 102 (denoted by $\mathcal{N}$) can be generated by deforming $\mathcal{N}$ to match the point-cloud $\mathcal{P}_n$ in all high confidence regions. For this, the point-cloud $\mathcal{P}_n$ is converted to a manifold mesh $\hat{\mathcal{P}}_n$ by employing Poisson reconstruction and using a similarity matching criterion combining distance, curvature, and surface normal correspondences between $\mathcal{P}_n$ and N are determined.

In some instances, the above process provides correspondences for relatively small variations between meshes, to increase the correspondences an incremental tracking process can be implemented. As an example, for each frame n of avatar 102 movement with corresponding acquired point-cloud $\mathcal{P}_n$, assuming that the motion of the avatar 102 performed between two consecutive frames is sufficiently small, $\mathcal{M}_n-1$ is used as the high quality mesh for the non-rigid registration step. Using these correspondences, we $\mathcal{N}$ is deformed to obtain a deformed mesh $\mathcal{M}_n$ that matches $\mathcal{P}_n$ using linear rotation-invariant coordinates.

Once the mesh 305 for the avatar 102 is created, the method 204 proceeds to process 306. In process 306, the actuation control for the avatar 102 is determined. In this process 306, the sensitivity of the avatar 102 for responding to certain movements and other characteristics of the target performance 109 is determined, which can be used later to determine the characteristics to be adjusted by the projectors 104, 106, 108. In one example, a physically based optimization method is used to initially compute the control of the actuators 118a, 118b, 118c, 118d of the avatar 102. In this example, the avatar 102 is activated to replicate the target performance 109 and as the skin 114 and/or other features of the avatar 102 move in response to the performance 109, the deformation of the skin 114 is matched to each frame of the target performance 109 (see FIG. 2B).

Often, the range of motion by the avatar 102 as produced by the actuators 118a, 118b, 118c, 118d is more limited than the target performance 109, i.e., the actuators 118a, 118b, 118c, 118d can accomplish the desired low frequency characteristics but do not accurately recreate the desired high frequency characteristics. With brief reference to FIGS. 2A and 2B, the high frequency characteristics of the target performance 109, such as forehead wrinkles 117 are not able to be accurately reproduced by the physical movement of the skin 114 in the avatar in FIG. 2B. In these instances, the motion of the avatar 102 produced by the actuators 118a, 118b, 118c, 118d may stop or become stationary once the target performance 109 moves out of the replication range of the avatar 102, i.e., requires a movement that is not capable of being reproduced by the avatar 102 itself. By projecting the images 154, 156, 158 onto the avatar 102 as will be discussed below, the avatar 102 displays textures that continuously present motion although the actuators 118a, 118b, 118c, 118d are not actually moving the avatar. In this manner, the actuation of the avatar 102 to replicate the target performance 109 takes into account the pose of the avatar 102 for the performance, as well as the dynamics.

In some examples, the actuated performance of the avatar 102 is created using physically based simulation where the mapping between parameters of the actuators 118a, 118b, 118c, 118d and the resulting deformation of the skin 114 is non-linear. In these examples, the timing of the performance of the avatar 102 by the actuators 118a, 118b, 118c, 118d is adapted to the target performance 109 and a linear behavior between adjacent frames is assumed. In other words, given a sequence consisting of $\mathcal{N}$ frames, a new sequence of the same length is created with each frame being a linear blend of two adjacent frames of the original motion of the avatar 102. To start, the temporally coherent mesh sequence for the actuated performance, $\mathcal{M}_n$, n=1 ... $\mathcal{N}$, along with its correspondence to the target performance 109 $\tau_n$, n=1 ... N is analyzed by the computer 112. Denoting the re-timed mesh sequence as $\hat{\mathcal{M}}_n$, n=1 ... N, it can be represented by a vector $\mathcal{T} \in [1 \ldots N]^N$ such that every element $\mathcal{T}_n \in \mathcal{T}$ means $\hat{\mathcal{M}}_n = \mathcal{M}_{\lfloor \tau n \rfloor} \cdot \alpha + \mathcal{M}_{\lceil \tau n \rceil} \cdot (1-\alpha)$, $\alpha = (\tau n - \lfloor \tau_n \rfloor)$. Using the error term discussed next, the computer 112 finds a vector $\mathcal{T}$ that minimizes the error between the target performance 109 $\mathcal{T}_n$ and the augmented actuation frames $\mathcal{M}_n$ induced by $\mathcal{T}$. In addition, the computer 112 may constrain the target performance $\mathcal{T}$ to be temporally consistent, that is, each element $\mathcal{T}_n \in \mathcal{T}$ to $\mathcal{T}_n < \mathcal{T}_{n+1}$ is constrained. In this manner, the computer 112 can use a constrained non-linear interior-point optimization to find the desired performance for the avatar 102.

To determine the error in the above equations, Eq. (1) below is used to get the error term of a vertex v in a target performance mesh $\mathcal{T}_n$ and its corresponding position u in an actuated one $\mathcal{M}_n$.

$$d(v, u) = |\vec{U}|\left(\frac{1}{|\vec{V}|}\frac{\partial |\vec{v}|}{\partial t} - \frac{1}{|\vec{U}|}\frac{\partial |\vec{u}|}{\partial t}\right) \cdot \omega_g + |\vec{U}|\left(\frac{|\vec{v}|}{|\vec{V}|} - \frac{|\vec{u}|}{|\vec{U}|}\right) \cdot \omega_s, \quad \text{Eq. (1)}$$

In Eq. (1), $\vec{v}$ is the displacement of v from the neutral pose of the avatar 102 in the aforementioned frame, $\vec{V}$ is the maximum displacement of v in the whole sequence, and $\vec{u}$ and $\vec{U}$ are their counterparts in the actuated motion. Adding the relative position error term helps to prevent the solution for converging to a local minima. In one example, values of 0.85 and 0.15 for $\omega_g$ and $\omega_z$, respectively, can be used.

To improve the optimization process, some assumptions can be made. As one example, each actuator 118a, 118b, 118c, 118d typically drives motion of the avatar 102 on a one-dimensional curve, which means that instead of considering the three-dimensional displacement of vertices 307 within the mesh 305 for the avatar 102, the distance of each vertex 307 from the neutral pose can be considered instead. As another example, the target motion for the avatar 102 may generally be reproduced accurately, but large motions for the avatar 102 may be clamped. Considering the relative position (the ratio of every vertex's 307 distance from the neutral pose to its maximum distance in the performance 109) allows a description of the motion relative to gamut of the target performance 109 as well as actuated performance physically performed by the avatar 102.

To optimize the movement, the optimization process in some examples starts with an initial guess that reproduces the original actuated motion $\tau = (1, 2, \ldots, N)$. During the optimization process, given the vector T, the induced actuated mesh sequence $\mathcal{M}_n, n = 1 \ldots N$ is generated and the error term using Eq. (1) is computed for a pre-selected random subset of the vertices. The error function used by the optimization d:[1 ... N]$^N \to R$ is the Frobenius norm of the matrix containing all the error measures per vertex per frame. Since this function is piecewise linear, its gradient can be computed analytically for each linear segment. To prevent local minima, the solution can be iteratively perturbate to generate new initial guesses by randomly sampling $\tau_n = [\tau_n - 1, \tau_n + 1]$ until there is no improvement of the solution in the current iteration. To ensure that the actuation control of the avatar 102 matches the target performance 109, the re-timed performance is replayed by the avatar 102 and the cameras 110a, 110b, 110c, 110d, 110e scan the exact geometry of $\mathcal{M}_n$ to obtain pixel-accurate data. That is, the avatar 102 is actuated to recreate the re-timed performance and the cameras 110a, 110b, 110c, 110d, 110e capture the video of the avatar 102 which may be used to determine the correspondence between the movements of the avatar 102 and the target performance 109.

With reference again to FIG. 5A, once the avatar 102 actuation control and geometry is determined by operation 204 as shown in FIG. 6, the method 200 proceeds to operation 206. In operation 206, the actuation of the target performance 109 is mapped to the avatar 102; this operation includes determining the limitations or sensitivity of the low frequency characteristics of the avatar 102 and separates the high frequency characteristics of the target performance from the low frequency characteristics. Operation 206 includes determining the texturing the avatar 102 that matches the target performance 109, or more specifically, those that in combination with the movement of the avatar will match the target performance. In operation 206, the target performance 109 may be rendered from one or more points of view, often two or more, and then the computer 112 deforms the images of the target performance 109 rendered from the one or more points of view to match the avatar 102 based on user specified semantics, these rendered images are then re-projected and blended onto the avatar 102 via the projectors 104, 106, 108.

In some examples, the avatar is mapped to match the target performance, including dynamics (such as gradients or velocities), as well as configuration (e.g., position or deformation).

Transferring the target appearance of a performance 109 onto the avatar 102 will now be discussed in more detail. Given a target performance 109 sequence, consisting of N frames and represented by a coherent set of meshes $\mathcal{T}_n, n = 1 \ldots N$, and a correlating sequence of the avatar $\mathcal{M}_n$, $n = 1 \ldots N$, operation 206 uses the computer 112 to determine the correspondence between the neutral pose of the target performance 109, denoted by $\mathcal{T}_o$, and the neutral pose of the avatar 102 $\mathcal{M}$. As described in operation 204 illustrated in FIG. 6, the correspondence is achieved by registering $\mathcal{T}_o$ onto $\mathcal{M}$. Next, for every frame $\mathcal{T}_n$, the target performance 109 is rendered onto the neutral pose of the avatar 102 from m points of view. In a specific example, four points of view were selected such that m equaled 4. However, the number of viewpoints is variable and can be changed as desired. Typically, the points of view are selected based on a desired coverage area for the avatar 102, such as views that are likely to be viewed in the avatar's 102 desired environment and the number and location can be varied accordingly.

Once the target performance 109 is rendered for each frame, the result is a set of images $I_i^{\tau_n}, i = 1 \ldots m$ and corresponding depth maps $Z_i^{\tau_n}, i = 1 \ldots m$. In some instances, the mesh 305 of the avatar 102 covers more of the avatar 102 rather than the target performance 102. For example, some frames of the target performance may not have any input (e.g., remain still or the like) on certain locations of the avatar. When these frames occur, the sections of the avatar covered by the relevant target performance may not have any information superimposed (such as texture details). In some instances, to prevent artifacts and to maintain a generally uniform appearance, the system may still project high frequency information onto the avatar in areas covered by the non-input of target performance. As one example, the high frequency details projected are extrapolated from the edge area of the target performance mesh onto the avatar. In these instances, the target information of the rendered images $I_i^{\tau_n}$ can be expanded, such as by mirroring the image across the mesh boundaries, adding a blurring term that grows with the distance from the boundary, or the like. In other examples, the computer 112 uses one or more hole filling or texture generation algorithms.

In some examples, the boundaries are determined by transitions between background and non-background depths in the depth maps $Z_i^{\tau_n}$. The corresponding frame for the avatar 102 is also rendered, after being rigidly aligned with $\tau_n$, creating the $I_i \mathcal{M}^n$ and $Z_i \mathcal{M}^n$ counterparts. Once the boundaries are determined, the images $I_i^{\tau_n}$ are deformed by the computer 112 to match their avatar's counterparts, using moving least squares. The deformation is typically driven by a subset of vertices, which constrain the pixels they are projected to in $I_i^{\tau_n}$ to move the projected position of their corresponding vertices in the avatar's rendering. This process acts to deform the low-frequency behavior of the target performance 109 to match the physical performance of the avatar 102, while keeping true the high-frequency behavior of the target performance 109. Selection of the driving vertices will be discussed in more detail below.

After the images are deformed, the computer 112 provides the images to the projectors 104, 106, 108 which project the images 154, 156, 158 back onto the avatar 102, and specifically onto $\mathcal{M}_n$—, every vertex receives the color from its rendered position on the deformed images, if it is not occluded. Blending between the different viewpoints of the projectors 104, 106, 108 can be determined based on the confidence of the vertex's color, determined by the cosine of the angle between the surface normal and viewing direction. Smoothing iterations, such as a Laplacian temporal smoothing iterations may be performed by the computer 112 on the resulting colors for every vertex.

As described above, the target performance 109 is rendered and the images are deformed to match the physical structure of the avatar 102. The deformation involves the image, $I_i^{\tau_n}$, the target performance mesh $\mathcal{T}_n$ along with the avatar's one $\mathcal{M}_n$ and the correspondence between them as defined by a non-rigid registration step. The deformation helps to adapt the desired features of the target performance 109 to the avatar 102, while also preserving the artistic intent of the target performance 109. This allows a user the means to indicate the semantics of the animation by selecting individual or curves of vertices of the target performance 109 and assign a property to it. In other words, in addition to capturing a target performance 109 and mapping that performance to the avatar, a user can customize the movements and other characteristics of vertices individually or in group. It should be noted that the properties of the vertices affect the behavior of the image deformation operation above.

In some embodiments, dividing the vertices into a plurality of types, such as three or more types, helps to convey the semantics, and each type of vertex may have the same categorization. Some examples of types for the vertex include vertices that are free to move, geometrically constrained vertices where the user defines vertices that constrain the pixels, and dependent constrained vertices. In some examples, the first type of vertex may be used as a default setting, i.e., each vertex is free to move and then the second and third type of constraints can be set by the user as desired. The second type of constraint allows a user to define vertices that constrain the pixels they are render to, which allows them to move to the position that their avatar's counterpart was rendered to, given that both are not occluded in the images. This type of constraint generally is selected for vertices that are static (or substantially static) throughout the performance, e.g., in some performances the nose of the avatar 102 may not move over the entire course of the performance. Additionally, this type of constraint is helpful for regions of the avatar 102 that overlap between the two meshes, such as the edges of the mouth and eyebrows in a human avatar. The third constraint helps to correct mismatches between the geometries of the target performance 109 and the avatar 102, in at least some regions, which could cause the projection of images onto the avatar to differ depending on the point of view. Using the third type of constraint marks vertices with an associated viewpoint such that the vertices are constrained to match vertices of the avatar 102 that they were projected closest to during the marked viewpoint.

In a specific example, 8 curves and 20 individual vertices are geometrically constrained and 2 curves and 5 individual vertices are constrained in a front-view dependent manner. However, depending on the desired movements, the shape and characteristics of the avatar 102, and desired user view points, the number and location of constrained vertices can be varied. It should be noted that other types of constraints may be used as well. Some examples of constraints that can be used include different effect radii and snapping vertices. In the latter example, vertices are snapped back into a position if the vertices move from the silhouette (or other boundary) of the avatar. These additional constraints can be used in conjunction with or instead of the vertices constraints.

With reference again to FIG. 5A, after operation 206 and the target performance 109 has been temporally remapped to the avatar 102 and the details of the target performance have been mapped to the avatar 102, the method 200 proceeds to operation 208. In operation 208, one or more characteristics for the projectors 104, 106, 108 for projecting images onto the avatar 102 are determined. In particular, operation 208 may determine one or more defocus parameters of the projectors 104, 106, 108 that may be taken into account for creating the final images projected onto the avatar 102.

Figure 9A:
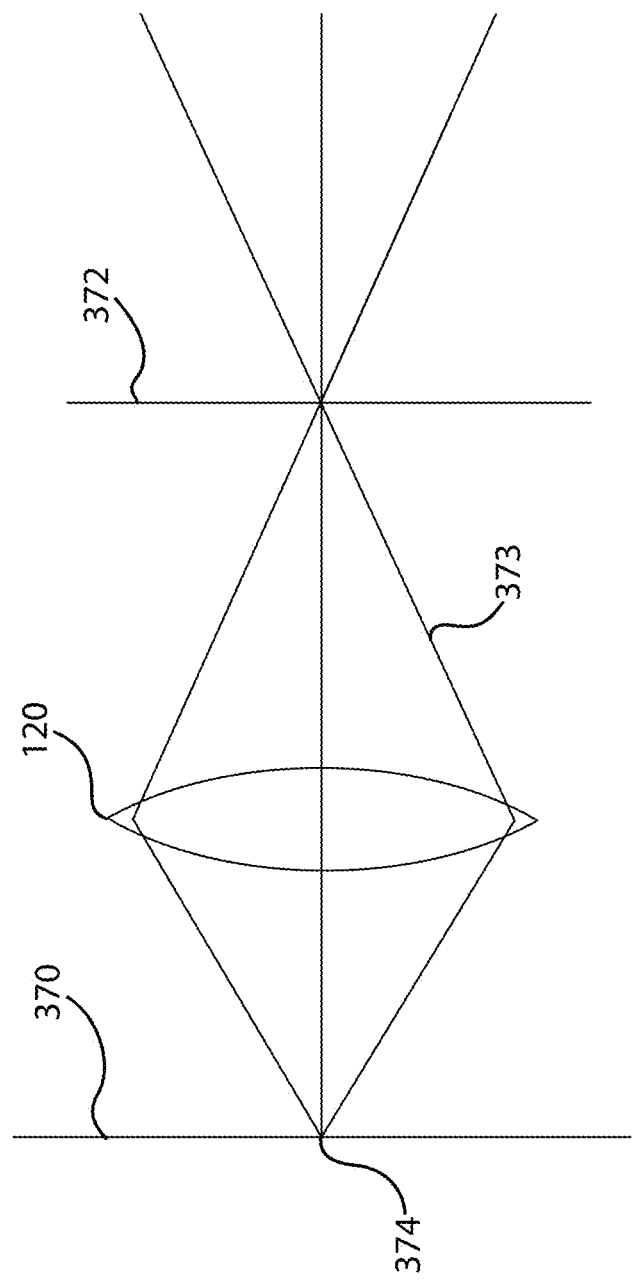
FIG. 9A is a diagram illustrating the focus characteristics of light as it transmitted from a projector.

FIG. 9A is a diagram illustrating the focus characteristics of light as it is transmitted from a projector. With reference to FIG. 9A, the projectors 104, 106, 108 receive an image to be projected and from a projector image plane 370, the pixels 374 of the image plane 370 are transmitted through the lens 120 of the projectors 104, 106, 108 to a focal plane 372. The focal plane 372 is typically the plane at which the light for the projectors 104, 106, 108 is configured to be focused to display the image from the image plane 370. However, as can be seen, light 373 corresponding to the image is expanded as it travels towards the lens 120 and then focused by the lens 120 on the focal plane 372. Prior to the focal plane 372 and to some extent even at the focal plane 372, the light 373 is not as focused as it is as the pixel 374 on the image plane 370. This results in the pixel 374 being defocussed or blurry at certain coordinates and distance from the projector 104, 106, 108. The point spread function (PSF) of a projector includes all parameters that can cause the pixel 374 to become defocused, and includes lens aberration, coma and defocus caused by the target surface being positioned outside of the focal plane 372. To determine the defocus parameters and then correct for them, operation 208 includes one or more processes that capture images and use the captured images to recover the projected blur due to projector defocus. The processes in operation 208 will now be discussed in further detail.

Figure 8:
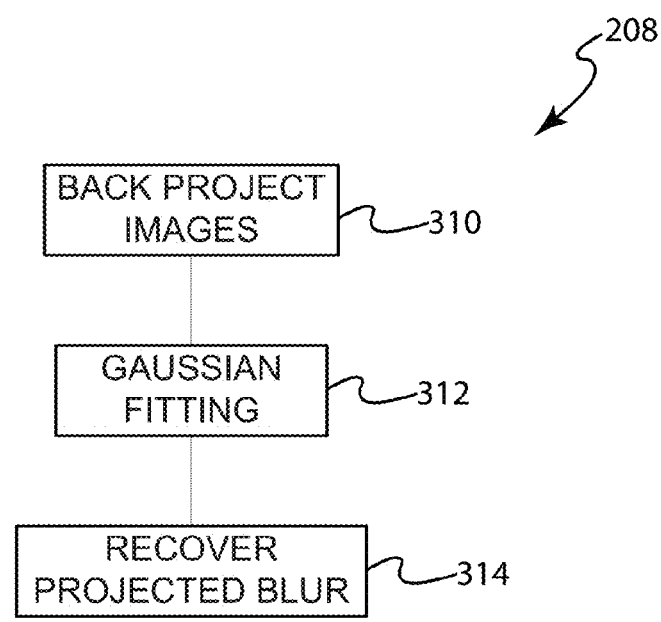
FIG. 8 is a flow chart illustrating a process for the determining the defocus parameters operation in FIG. 5A.
Figure 9C:
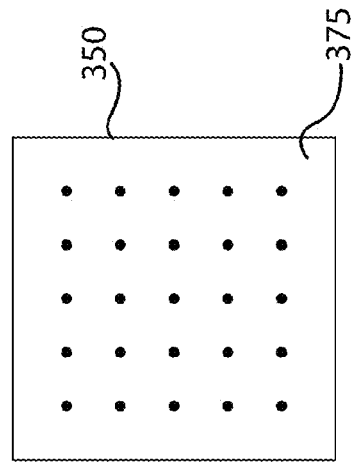
FIG. 9C is a front elevation view of the defocus image being projected onto the surface.
Figure 9B:
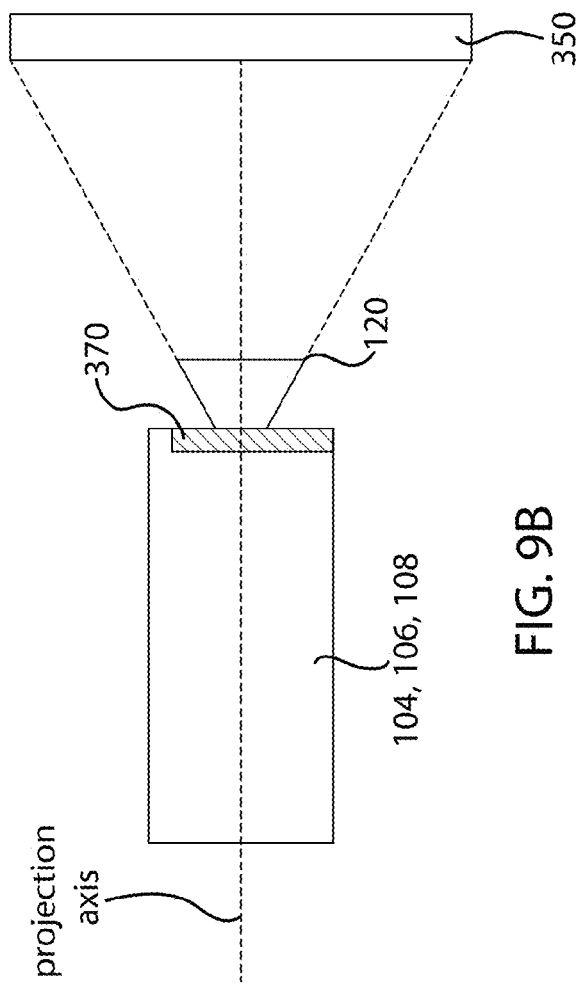
FIG. 9B is a block diagram illustrating a projector projecting a defocus image onto a surface.
Figure 9D:
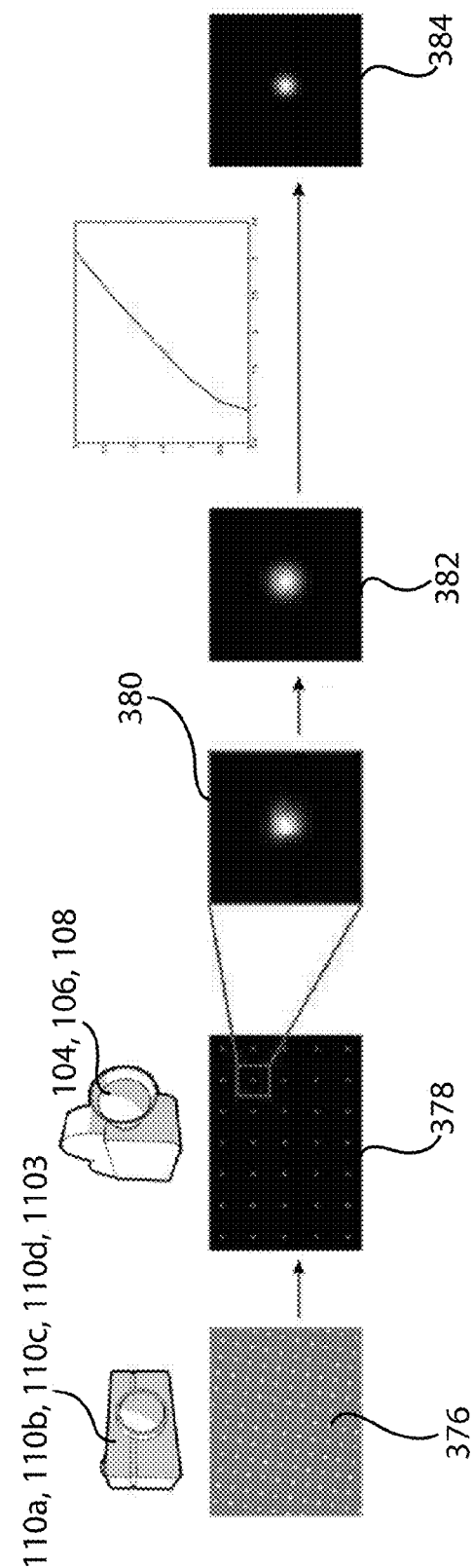
FIG. 9D is a block diagram of using the defocus image to determine one or more defocus characteristics of one or more projectors of the system of FIG. 1A.

FIG. 8 is a flow chart illustrating illustrative processes for operation 208. FIGS. 9B-9D depict select processes within operation 208. With reference to FIG. 8, operation 208 may begin with processor 310. In process 310, one or more images may be captured by the cameras 110a, 110b, 110c, 110d, 110e of images being projected by the projectors 104, 106, 108 onto the avatar and those captured images are then back projected onto the avatar 102. In some examples, the back projected image or images may include a pattern or other characteristic that allows for the defocus parameters of the projectors to be more easily determined.

The images are back projected to the image plane of each of the projectors 104, 106, 108 and may be normalized. As one example, with reference to FIGS. 9B-9C, each projector 104, 106, 108 projects an image 375 of a two-dimensional grid of white pixels on a black background onto a surface 350 that in this example is a flat white surface oriented substantially orthogonal to the projection axis of the select projector 104, 106, 108. This surface 350 is placed at different distances around the focal plane 372 of the projector 104, 106, 108 and camera images 376 are taken of the projected pixel pattern of the projected image 375 using one or more cameras 110a, 110b, 110c, 110d, 110e (see FIG. 9D). The captured images 376 are then back projected onto the surface 350 creating back projected images 378.

Both the number of measurements and the grid distance between two pixels can be changed depending on a desired measurement density, acquisition time, and/or processing complexity and time. Although, in the above example the pattern of the image 375 is white pixels on a black ground, other monochrome images may be used or the projected pattern can be independent for each color channel. In instances where the projected pattern is independent per color channel, this pattern may be used to adjust defocus for projectors that exhibit different varying defocus behavior based on the color, such as in instances where the projectors have different light pathways (e.g., LCD projectors or three-channel DLP projectors), or if the projectors have a strong chromatic aberrations. However, in instances where the projectors may not exhibit significant chromatic aberrations, the pattern may be monochrome and the position (x and y) can be ignored, as any deviation of those coordinates from the coordinates of the originally projected pixel can be explained by inexact back projection.

With continued reference to FIGS. 8 and 9B-9C, after process 310, operation 308 may proceed to process 312. In process 312, each back projected image is split into sections or patches 380, and a Gaussian fitting is used for each patch 380. Projector defocus can be approximated by a two-dimensional Gaussian function and in this example a two-dimensional isotropic Gaussian function in the projector's image coordinate is used, an example of which is reproduced below as Eq. (2), maybe used to estimate the projector defocus.

$$PSF_z(xy, xy') = e^{-\frac{(x-x')^2+(y-y')^2}{\sigma_{x,y,z}^2}} \quad \text{Eq. (2)}$$

In Eq. (2), x and y are pixel coordinates of the pixel from which the projected light originates, x' and y' are the pixel coordinates of the target pixel that is illuminated by the defocused pixel, z is the distance to the projector in world coordinates of the surface corresponding to the target pixel, and σ is the standard deviation of the Gaussian function. In other words, x and y represent the location of the pixel of the image plane 370 and x' and y' represent the location of the pixel at the surface 350. The Gaussian function illustrated in Eq. (2) may be defined in the coordinate frame of the projector 104, 106, 108 and in this example each of the back projected images 378 are projected into the image plane of the projector's image plane. In one example, homographies may be used to ensure that the captured images 376 are projected into the projected image plane. In particular, the σ value and a position x and y for each image patch 380 may be determined.

Using the homographies computed by the computer 112 in combination with the cameras 110a, 110b, 110c, 110d, 110e that may be geometrically calibrated, the computer 112 can compute the distances to the projector 104, 106, 108 for each pattern. The σ values together with their respective distances and pixel coordinates constitute a dense, irregular field of defocus measurements (PSF field) can be used by the computer 112 to build the equation system for compensation. Depending on the density of the measurements, the defocus values for each point inside the covered volume can be interpolated with high accuracy.

Once the σ values have been determined, operation 208 proceeds to process 314. In process 314, the amount of projector blur from a particular projector 104, 106, 108 is recovered. Process 314 is a sigma calibration that provides an additional calibration that can help to determine the blurring behavior of the capturing and model fitting process (e.g., the process between capturing the images 376 with the cameras 110a, 110b, 110c, 110d, 110e, back projecting, and analyzing the images). The process 314 can produce more accurate defocus values because often the noise, such as environment light, can produce σ values much greater than 0 in the Gaussian fitting, even when measuring next to the focal plane 372. Reasons for this large defocus values that include coma and chromatic aberrations of the camera lenses, the aperture settings of the cameras, sampling inaccuracies both on the camera (or image sensor of the camera) and during the back projection process 310, and/or noise.

Using process 314, the sigma calibration determines the blurring that is due to the other elements of the system to isolate the defocus of the projectors 104, 106, 108 themselves. This process 314 includes positioning a white plane (this can be the same plane used in process 310), above into the focal plane and project a single pixel on black background, followed by Gaussian blurred versions of the same with increasing σ. The captured patterns are then fitted to Gaussians to create a lookup table (LUT) between the σ values of the actually projected Gaussian functions, and the ones found using the measurement pipeline. Using this process 314, the defocus due to each projector 104, 016, 108 can be determined and as described in more detail below, can be taken into account in the final images projected onto the avatar 102.

After process 314, operation 208 is complete and with reference to FIG. 5A, the method 200 may proceed to operation 210. In operation 210, the images that will be projected onto the avatar 102 to create a desired performance will be optimized. In particular, the light transport within the avatar 102 is determined and used to adjust the images to compensate for the light transport in the avatar 102. Operation 210 includes a plurality of processes which are illustrated in FIG. 8, which is a flow chart illustrating the processes that may be included in operation 210.

Figure 10:
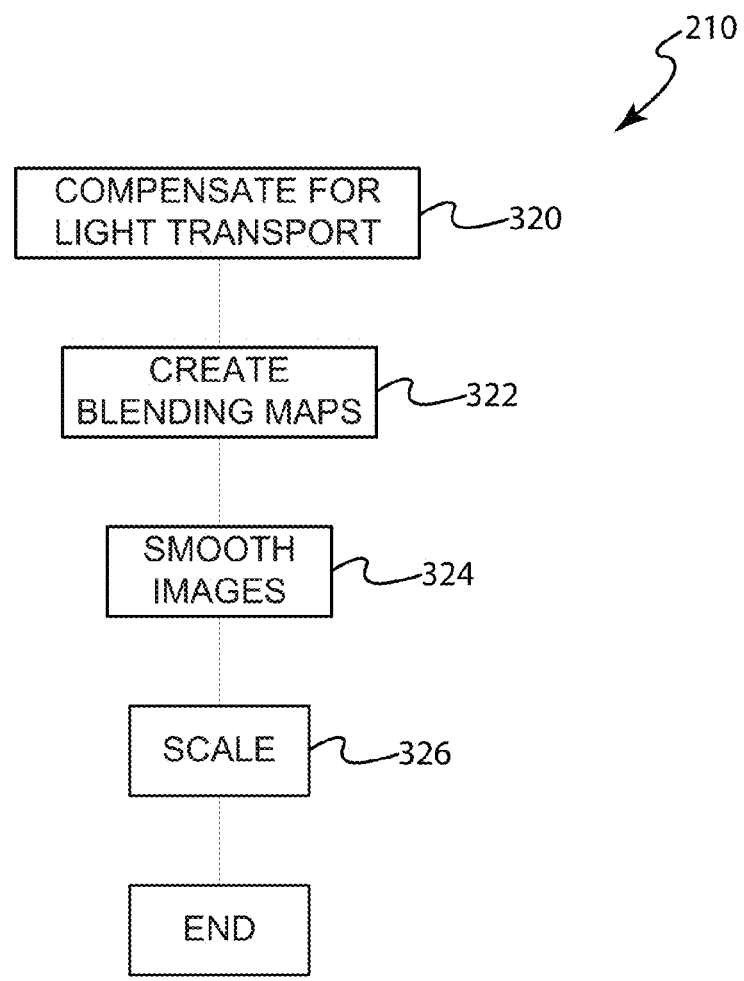
FIG. 10 is a flow chart illustrating the processes for the optimizing projected images operation of FIG. 5A.

FIG. 10 is a flow chart illustrating the processes for operation 210 of FIG. 5A. With reference to FIG. 10, operation 210 may begin with process 320. In process 320, the light transport for the avatar 102 is computed and the images 154, 156, 158 that will be projected onto the avatar 102 are then compensated to account for the light transport (due to both the projector light transmission process and the skin and other characteristics of the avatar). In one example, the light transport is modeled as matrix-vector multiplication as provided in Eq. (3) below.

$$C=LP \quad \text{Eq. (3)}$$

In Eq. (3) P is a vector containing the projected images, L is a matrix containing the light transport, and C is the output of the system 100. In some examples, C represents the set of images that could potentially be captured by the projectors 104, 106, 108 (if they included an image sensor). In other systems that adjust images for light transport, a reference camera is typically used as an optimization target. In other words, the optimization for light transport is based on the location of a reference camera and not the location of a projector that is projecting the images. In the present example, the projectors 104, 106, 108 are treated as virtual cameras, which allow the defocus of the projectors to be pre-corrected at the location of the projection versus a reference camera.

Compensation of the light transport includes finding the images P that produce the output C when being projected and may be determined by an inversion of the light transport provided in Eq. (3), the inversion is illustrated as Eq. (4) below.

$$P'=L^{-1}C' \quad \text{Eq. (4)}$$

In Eq. (4), c' is the desired output of the system 100 and $P'$ is the input that produces it when projected. In most cases, directly inverting L may be is impossible as L is not full rank. Therefore, rather than directly inverting L the compensation is reformulated as a minimization problem as expressed by Eq. (5) below.

$$P'=\mathrm{argmin}_{0 \leq P \leq 1}\|LP-C'\|^2 \quad \text{Eq. (5)}$$

The minimization of Eq. (5) can be extended to contain locally varying upper bounds, weighting of individual pixels, and additional smoothness constraints, resulting in the minimization of Eqs. (6) and (7) below.

$$P' = \underset{0 \leq P \leq U}{\mathrm{argmin}} \|W(TP-S)\|^2 \quad \text{Eq. (6)}$$

$$= \underset{0 \leq P \leq U}{\mathrm{argmin}} \left\| W\left( \begin{bmatrix} L \\ \mathrm{Smooth} \end{bmatrix} P - \begin{bmatrix} C \\ 0 \end{bmatrix} \right) \right\|^2 \quad \text{Eq. (7)}$$

In Eqs. (6) and (7), S is a vector containing the target images C' and the smoothing target values of constant 0. T is a matrix consisting of the light transport L and the smoothing terms Smooth. W is a diagonal matrix containing weights for each equation and U contains the upper bounds of the projected image pixel values.

To determine the light transport, the components of the light transport can be evaluated iteratively. For projector defocus, the σ is looked up in the PSF field at the pixel coordinates of the source pixel as well as at the depth of the target pixel. The PSF model is then evaluated using this σ, and the resulting value is normalized such that all the light emitted at the same source pixel sums up to one.

In some examples, to provide a uniformly bright appearance in the compensated images, light drop-off caused by distance to the projectors 104, 106, 108 and the incidence angle of the light at the surface of the avatar 102 can be included in the light transport. For example, the light drop-off factor is multiplied on top of the defocused projection computed previously to have uniformly bright appearance.

In many instances, subsurface scattering of light physically happens after projector defocus. In other words, the projector defocus originates at the projector and thus at the location where the light is first emitted, whereas subsurface scattering occurs only the light hits the surface. Therefore, often light emitted from one pixel can travel to the same target pixel using multiple paths, so care has to be taken to sum up those contributions correctly.

The subsurface scattering factor is looked up in the previously measured scattering profile with the world coordinate distance between the two involved surface points. However, this formulation does not take into account variations in the topography or thickness of the skin 114, which in one example is silicone. For example, the formulation may be valid for flat patches of silicone with a certain thickness. The avatar 102 typically includes surfaces that vary in thickness, as well as a varying topography and depending on the desired sensitivity of the system 100, these variations can be taken into account to improve the subsurface scattering factor.

The above description of operation 320 is done with respect to one projector 104, 106, 108 for the system. However, as shown in FIG. 1A, in some examples, the system 100 may include two or more projectors 104 106, 108. In these instances, additional modifications may be done to fill in the cross single projector light transport (PLT) without changing the values previously determined.

As one example, rather than re-computing projector defocus and subsurface scattering for the cross-PLT, the relevant values are looked up in the results of the single PLT using a projective mapping between the projectors 104, 106 108. As at a certain surface patch of the avatar 102 the pixel densities of the involved projectors 104, 106, 108 might differ heavily in these instances one-to-one mapping between pixels of different projectors may not be as accurate. Instead a weighting function can be used that behaves either as an average over multiple dense source pixels to one target pixel (e.g. from projector 104 to projector 106), or as a bilinear interpolation between 4 source pixels to a dense set of target pixels (from projector 104 to projector 106). This weighting function is then convolved with the previously computed single PLT, resulting in cross PLT.

As briefly mentioned above, in some instances, each of the projectors 104, 106, 108 may be substantially the same or otherwise calibrated to have similar properties. This helps to ensure that the computed cross PLT actually has similar units.

Figure 10A:
FIG. 10A is an example of a three blending maps.
Figure 10A:
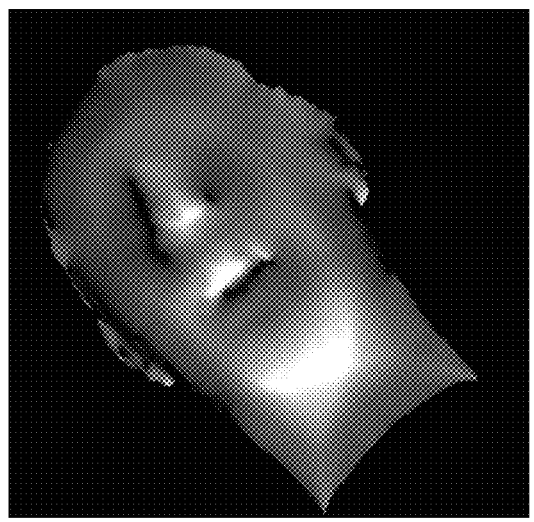
Figure 10A:

With reference again to FIG. 10, once light transport has been compensated for in process 320, operation 210 may proceed to operation 322. In operation 322 one or more blending maps or blending images are created. The blending maps help to provide consistent intensities in overlapping projection areas of the avatar 102. FIG. 10A illustrates three sample input alpha maps that can be used as blending maps to provide consistent intensities in overlapping projection areas. In particular, the blending maps help to ensure constant, or at least smooth, brightness at the boarders of the display fields 164, 166, 168 of the projectors 104, 106 108 (see FIG. 1C) where the fields overlap. The blending maps may be alpha maps in the projector image planes and each image that is projected using multiple projectors is multiplied with the blending images.

Figure 11:
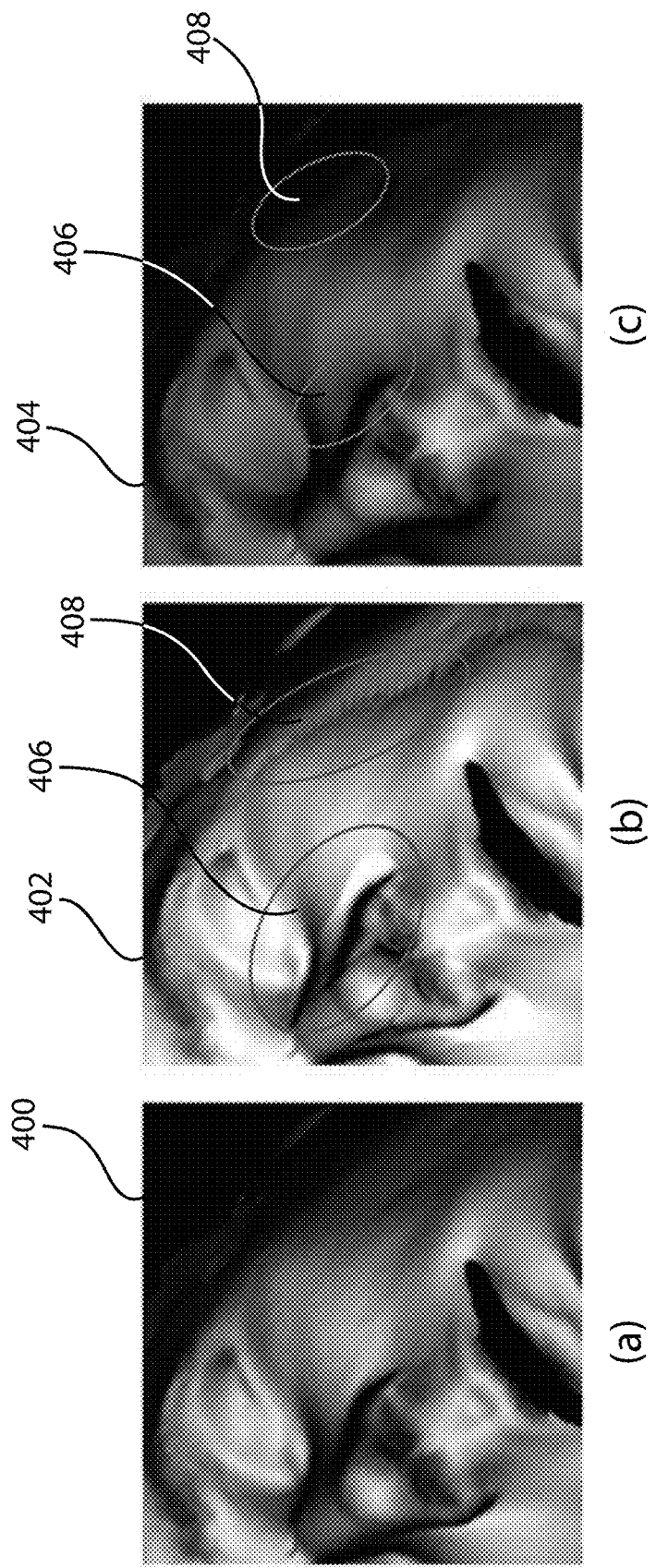
FIG. 11 is a front elevation view of (a) an input image, (b) a compensated image or modified image, and (c) a blended compensated image.

FIG. 11 illustrates three images (a), (b), and (c), those images are an input image 400, a compensated image 402, and a blended compensated image 404. As shown in FIG. 11, the blended image 404 has substantially consistent intensities, even in overlap areas 406, 408 where the images from two or more of the projectors 104, 106, 108 overlap. Without blending, as shown in the compensated image 402, when projecting onto objects such as the avatar 102 that are discontinuous when seen from a specific projector, scaling down the projector contribution in the proximity which helps to prevent calibration errors from being visible. Images from multiple projectors that are not defocused can produce artifacts such as discontinuities. Also, in instances where light drop-off caused by incidence angle by not blending, the projectors typically increase their intensity when projecting onto oblique surfaces, rather than leaving the illuminating of such surfaces to another projector in a better position.

In one example, the blending map calculation may be geometry based and use a shadow volume calculation to detect discontinuous regions in the projector image planes and smoothly fade out the individual projector intensities in these areas, as well as at the edges of image planes in the overlap areas 406, 408. The geometry based blending maps consider the mesh geometry as well as the position and lens parameters of the projectors to simulate which pixels of each projector are not visible from the point of view of all others. After having determined those occluded areas as well as the ones in which multiple projectors overlap. Smooth alpha blending maps (see FIG. 10A) are calculated by ensuring that at each occlusion and edge of a projection image frame the according projector fades to black. The blending maps can be incorporated into the minimization as upper bounds (U in Eq. (7)). As shown in FIG. 11 in the blended image 404, the overlap areas 406, 408 at discontinuity areas on the avatar 102 (nose and cheeks) do not have perceptual artifacts, especially as compared with the compensated non-blended image 402.

To create the blending maps, in areas of the avatar 102 where the images of one or more of the projectors 104, 106 108 overlap, such as the overlap areas 406, 408 illustrated in FIG. 11, one point on the avatar 102 surface is represented by multiple pixels in the image planes of multiple projectors 104, 106, 108. If each of those pixels had the same weighting in the residual computation, the overlap areas 406, 408 would be treated as more important than non-overlapping regions. Not all solution pixels have the same accuracy requirements: Therefore, generally, it is preferred for each projector to find good solutions for image patches for which it is the only projector, or onto which it projects orthogonally (i.e. in the highest resolution and brightness) or with the best focus values. These criteria are used by the computer 112 to create the blending maps. The uniform importance of errors corresponds to uniform brightness, the other criteria typically follow directly. For this reason, blending maps are also a good way to weight the individual equations in Eq. (7). In this manner, W contains as its diagonal the pixel values of blending maps. By using the blending maps as the upper bounds and weighting Eq1 (7) accordingly, artifacts may be further reduced or eliminated in the blended image 404.

With reference again to FIG. 10, once the blending maps have been created, operation 210 may proceed to process 324. In process 324, the images are smoothed, to reduce artifacts that could potentially be caused by under or over estimations of the projector defocus, as well as adjusting for compensation artifacts as the images are composed by the projectors. For example, in some instances the first projector 104 may completely produce the image for a first pixel and the second projector 106 may completely produce the image for a second pixel adjacent the first pixel. In this example, small calibration errors in either of the projectors 104, 106 could result in image artifacts as the images are projected.

In one example, the smoothing process 324 includes comparing neighboring pixels in the optimized image. This is based on the idea that if the input image is smooth in a particular region, the output image projected onto the avatar should be smooth as well. Local smoothness terms that can be used are expressed by Eqs. (8) and (9) below.

$$0 = \alpha_{xyxy'}(P_{xy} - P_{xy'}) \qquad \text{Eq. (8)}$$

$$\alpha_{xyxy'} = 1 - \frac{|C'_{xy} - C'_{xy'}|}{\max(C'_{xy}, C'_{xy'})}. \qquad \text{Eq. (9)}$$

In Eqs. (8) and (9), xy and xy' are the pixel coordinates of direct neighbors, and is a weight that depends on the local smoothness of the input image. This smoothness in Eq. (9) is somewhat strict as pixel pairs that have the same value in the input image but are right next to a hard edge are still restricted with the highest possible α value, even though such a hard edge typically produces ringing patterns for the compensation over multiple neighboring pixels. To adjust for this formulation, the Eq. (10) below is used which takes into account all neighbors in a certain neighborhood and then use the minimum weight found this way, instead of only considering the direct neighbor as outlined in Eqs. (8) and (9).

$$0 = w_{smooth}\left(\min_{xy'' \in B_{xy}} \alpha_{xyxy''}\right)(P_{xy} - P_{xy'}) \qquad \text{Eq. (10)}$$

In one example, in Eq. (10) the neighborhood B was set to be a 15 by 15 block of pixels with the pixel (x, y) as center. $w_{smooth}$ is a user adjustable weight. It should be noted that that although a larger neighborhood is used to compute the weight, only one term is added to the equation system for each pair of directly neighboring pixels.

With reference again to FIG. 10, after the smoothing process 324, operation 210 may proceed to process 326. In process 326, the images are scaled. In particular, generally, the defined light transport for the system 100 is in non-specified units and the values are relative to an undefined global scaling factor. Light transport is generally linear which allows the scaling factor to be adjusted without changing the underlying light transport. Some components, however, change the global scale of the input vs. the output image, such as distance based light drop-off. For example, if projecting onto a plane at a distance of 1 m and the global coordinate system is specified in millimeters, the light drop-off changes the scale as provided in Eq. (11) below, assuming no defocus and subsurface scattering.

$$C'_{xy} = (TP)_{xy} = \frac{1}{1000^2} P_{xy} \qquad \text{Eq. (11)}$$

In Eq. (11), if no additional scaling factor is introduced the best P would be a completely white image, as this is closest to the input image c'. However, a global scaling factor can be introduced manually, and can be estimated by the computer 112. The general idea is to determine the smallest scaling factor such that each pixel of the desired image can still be produced without clipping. This idea is expressed as Eq. (12) below.

$$s = \max_{xy, C'_{xy} > 0} \frac{(LU)xy}{C'_{xy}} \qquad \text{Eq. (12)}$$

Because both the light transport matrix L and the upper bounds U contain non-negative values, the product LU represents the brightest result image that can be produced with the given setup. For each pixel a scale factor is computed by comparing its target intensity with its highest possible intensity. The maximum of those values is a good candidate for the global scale factor, as it ensures that it is possible to produce the desired image without clipping. This scaling factor is introduced into the equation to determine Eq. (13).

$$P' = \underset{0 \leq P \leq U}{\operatorname{argmin}} \left\| W\left(TP - \frac{1}{s}S\right) \right\|^2 \left\| W\left(TP - \frac{1}{s}S\right) \right\|^2 \qquad \text{Eq. (13)}$$

Eq. (13) can be solved by the computer 112 by using an iterative, constrained, steepest descent algorithm as the solver for this equation system. Using Eq. (13) the images 154, 156, 158 may be created that will best replicate the high frequency details of the target performance 109 to create a desired effect for the avatar 102.

Figure 12A:
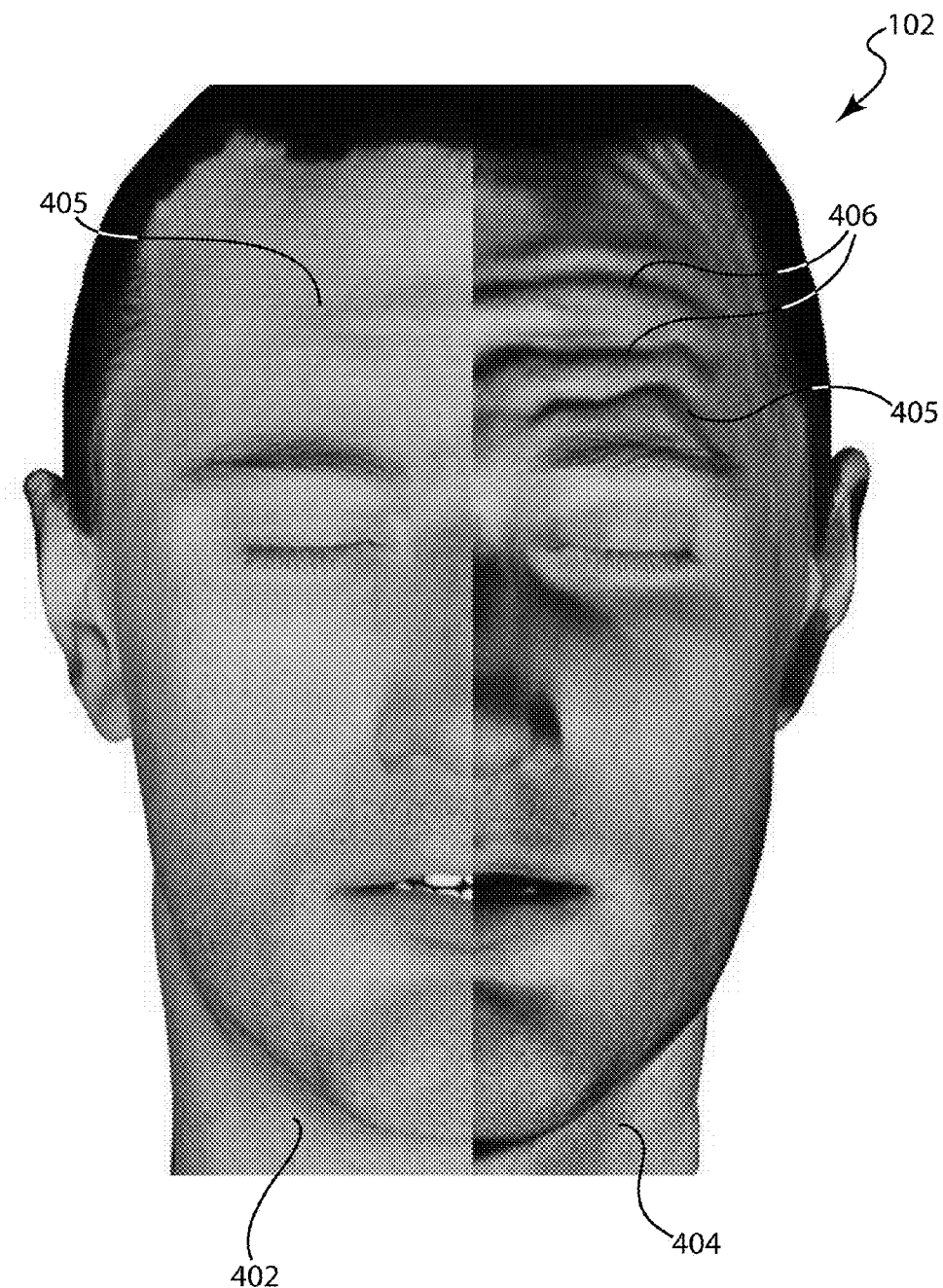
FIG. 12A is a photograph illustrating a front elevation view of the avatar with only half of the avatar having the modifying images projected thereon.
Figure 12B:
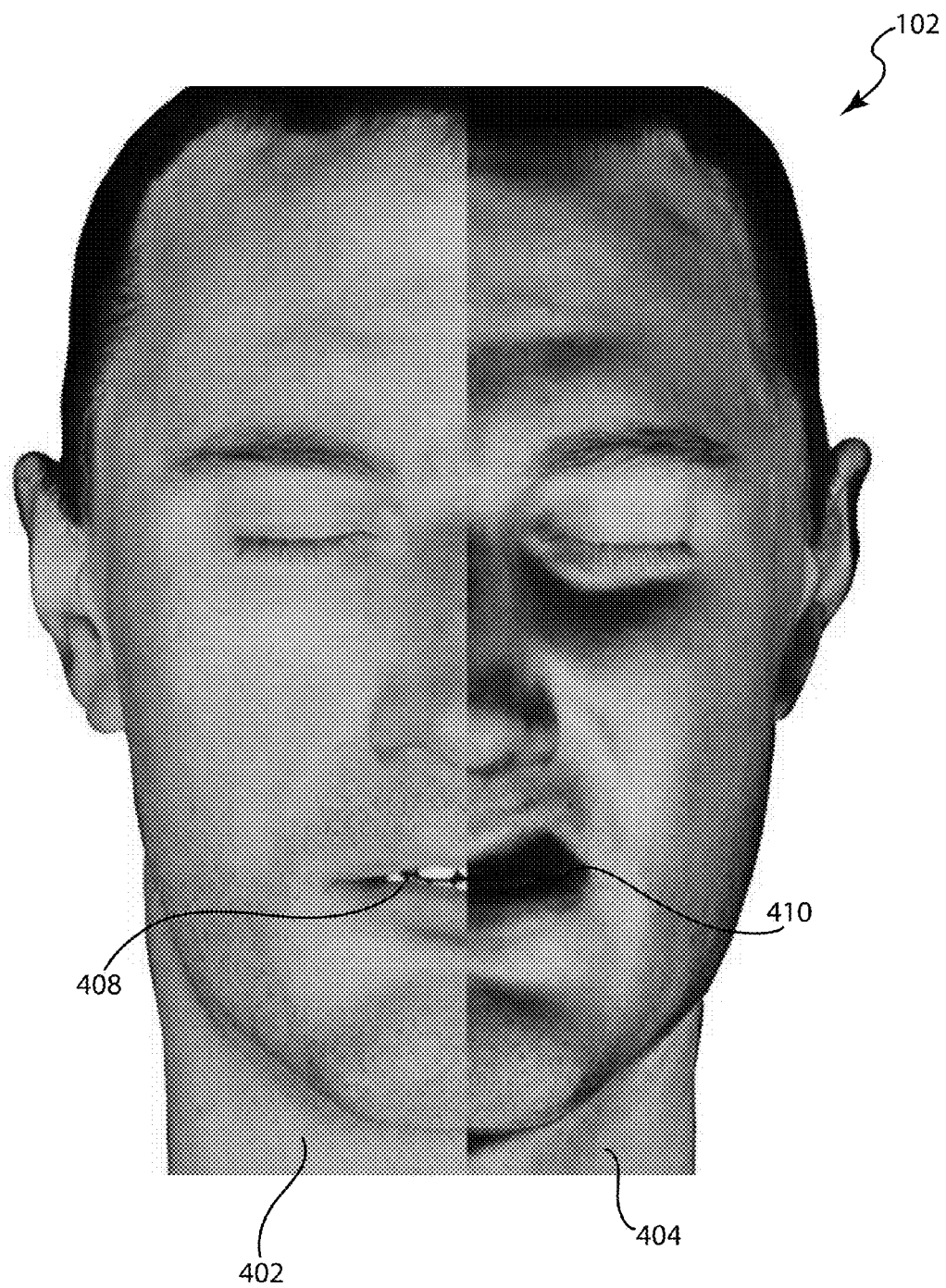
FIG. 12B is a photograph illustrating another examples of the avatar with only half of the avatar having the modifying images projected thereon.
Figure 12C:
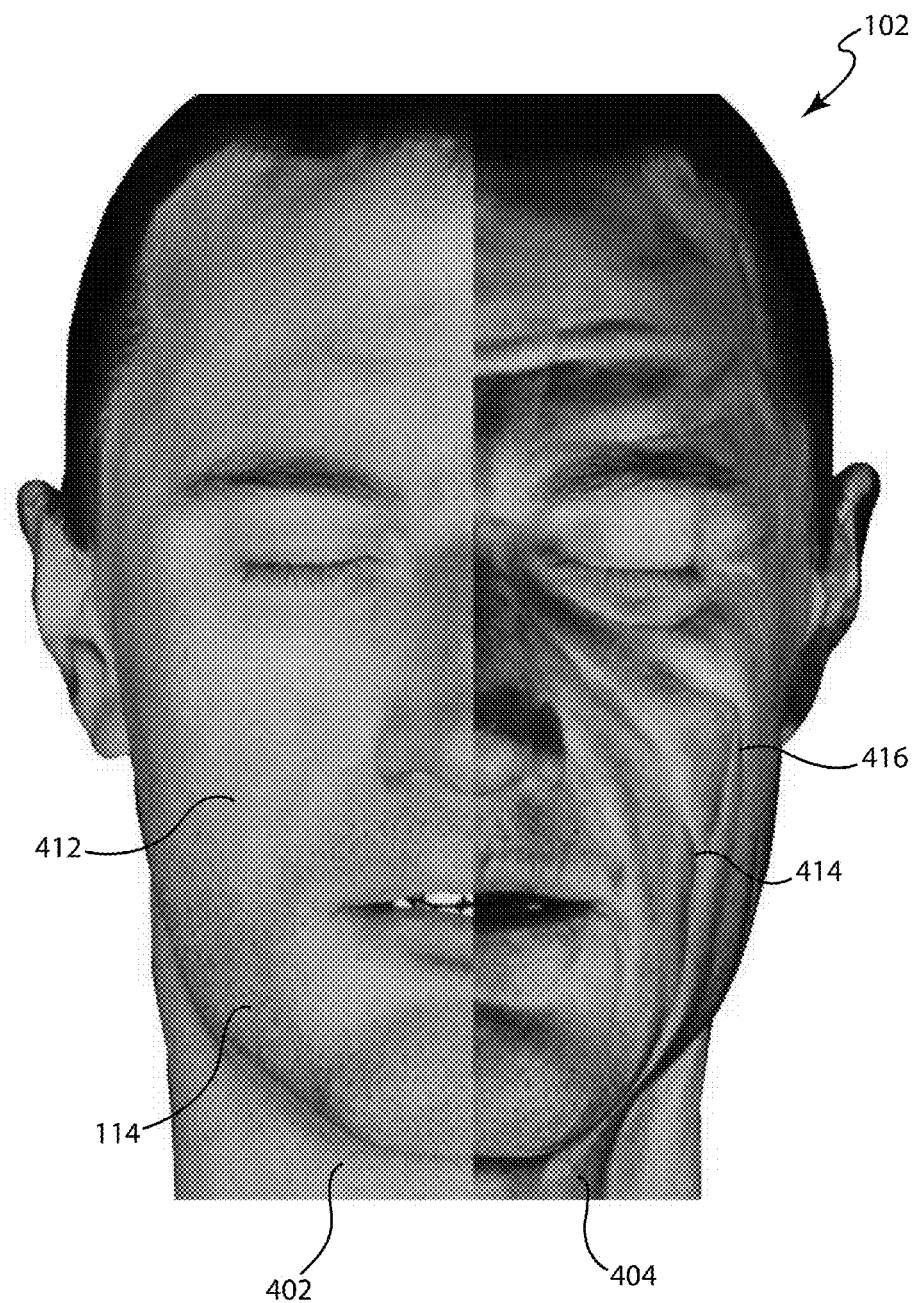
FIG. 12C is a photograph illustrating yet another example of the avatar with only half of the avatar having the modifying images projected thereon.

Examples of the system 100 replicating the target performance 109 with the avatar 102 and projectors 104, 106, 108 will now be discussed. FIGS. 12A-12C are photographs illustrating front elevation views of the avatar 102 with half of the avatar 102 having the images 154, 156, 158 projected thereon. With reference to FIG. 12A, a first side 402 of the photograph illustrates the avatar 102 without enhancement from the images 154, 156, 158 and a second side 404 illustrates the avatar 102 with image enhancement. In both sides 402, 404 the avatar 102 in the same physical position, but the lighting has been varied to create the high frequency characteristics of the target performance 109. In particular, the second side 404 of the avatar 102 has the appearance of wrinkles 406 on the forehead, whereas the forehead in the un-enhanced side 402 does not have the wrinkles. The wrinkles 406 in this case are high frequency details and are created by the images 154, 156, 158 being projected onto the avatar 102 by the projectors 104, 106, 108.

With reference to FIG. 12B, in this photograph, the physical position of the mouth 408 of the avatar 102 on the first side 402 is partially open with the lips being somewhat parallel to each other and the mouth 410 on the second side 404 appears to be partially open with one of the lips raised up. As shown in FIG. 12B, the avatar 102 may not have to physically move to create the appearance of movement, which means that the avatar 102 may be less mechanically complex, require less sensitive actuators, and/or be stationary although the target performance 109 may require movement.

In addition to creating high frequency details and movements, the images 154, 156, 158 may also be used to add skin color, texture, or the like. With reference to FIG. 12C, the images 154, 156, 158 can create the appearance of age for the avatar 102. For example as shown in the first side 402 of the photograph, the skin 114 of the avatar 102 does not have any wrinkles or shade lines, e.g., the cheek 412 is substantially smooth. With reference to the second side 404 the cheek area 414 has wrinkles 416 and other varying topography that creates the appearance of age for the avatar 102.

Figure 13A:
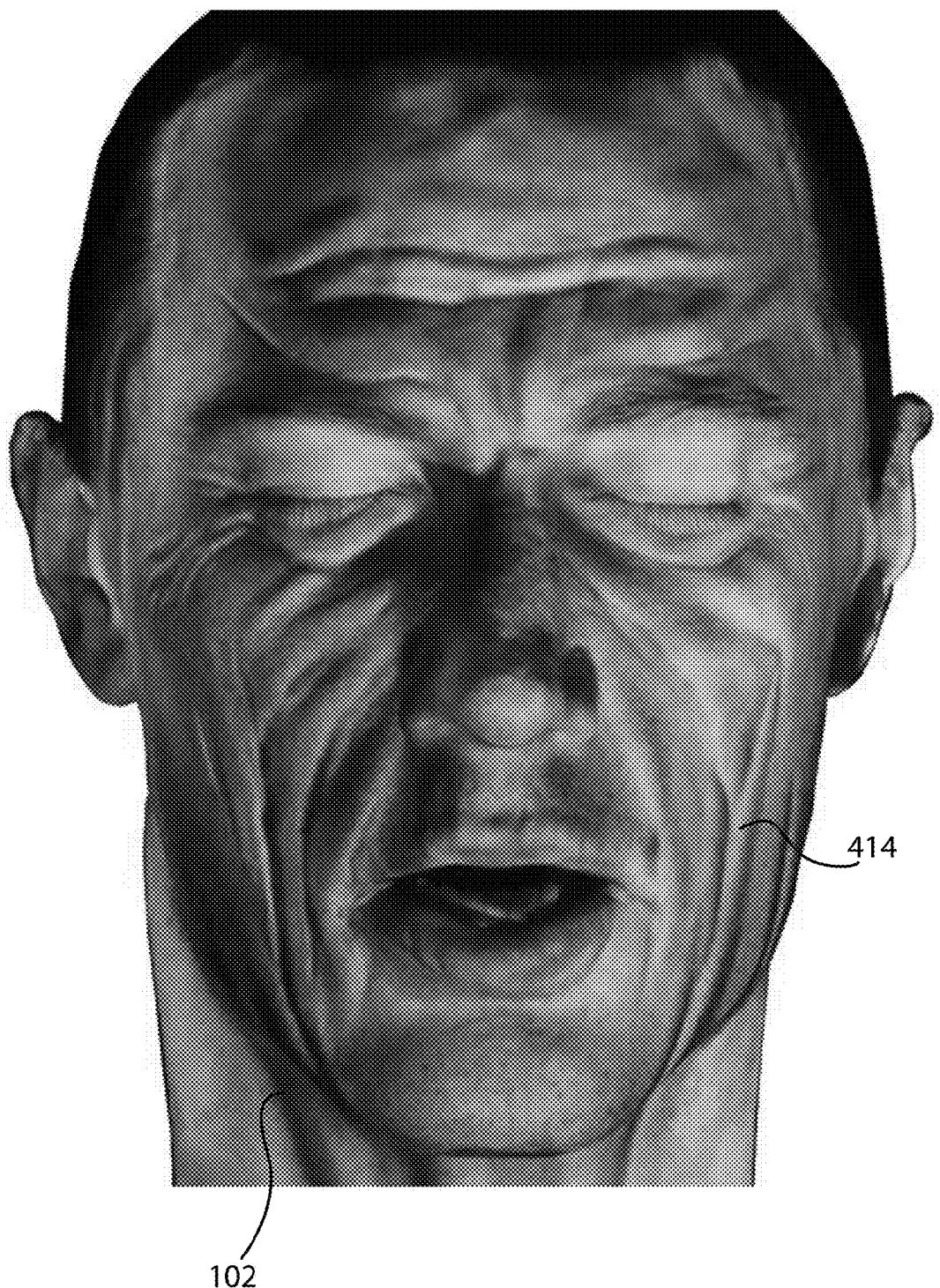
FIG. 13A is a photograph illustrating a front elevation view of the avatar with the modifying images projected thereon.
Figure 13B:
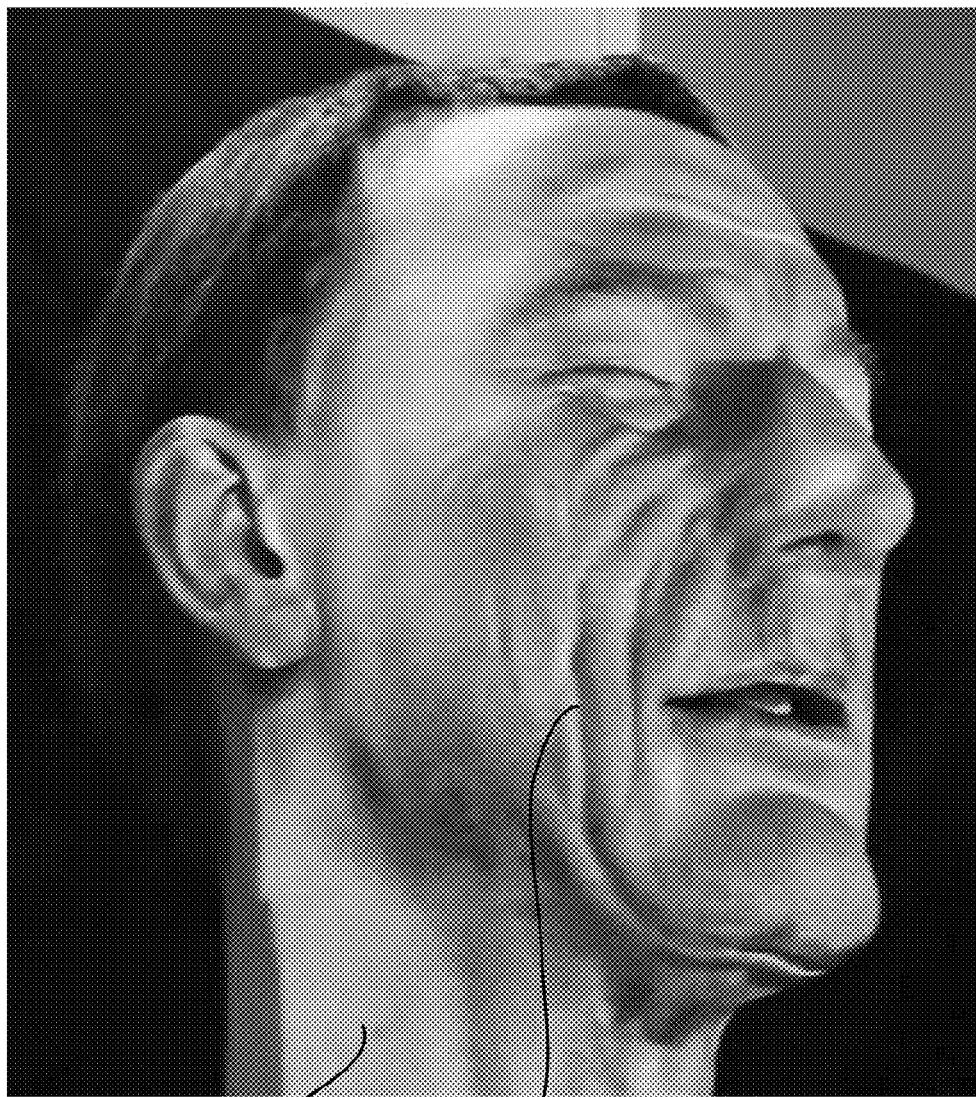
FIG. 13B is a photograph illustrating a bottom perspective view of the avatar with the modifying images projected thereon illustrating the view point independent appearance of the augmented avatar.

As discussed above, the system 100 allows the avatar 102 to have a substantially uniform appearance regardless of the viewing angle. FIG. 13A is a front elevation view of the avatar 102 with a projected image. FIG. 13B is a front-bottom perspective view of the avatar of FIG. 13A. With reference to FIGS. 13A and 13B, the appearance of the avatar 102 created with the projection of the images 154, 156, 158 by the projectors 104, 106, 108 is substantially uniform between the views of FIGS. 13A and 13B. This allows a user to have a more realistic experience with the avatar 102, as substantially regardless of the viewing angle the avatar 102 will have a uniform appearance.

Conclusion

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for projecting images using two or more projectors onto a three-dimensional surface to alter the appearance of the three-dimensional surface comprising:
    modeling a defocus of each projector of the two or more projectors, wherein the model is independent of a location of the three-dimensional surface and a location of each prosector;
    determining the light transport of the three-dimensional surface;
    detecting discontinuous projection depths on the three-dimensional surface by using a computer to analyze a three-dimensional mesh corresponding to the three-dimensional surface;
    adjusting by the computer a first input image and a second input image to create a first modified image and a second modified image based on
        the defocus of each projector;
        the light transport of the three-dimensional surface; and
        a characteristic of the first input image and the second input image at a location of the discontinuous regions; and
    projecting the first modified image and the second modified image onto the three-dimensional surface.

2. The method of claim 1, wherein modeling a defocus of each projector comprises:
    capturing by at least one camera a defocus image of a pattern projected by the projector on the three-dimensional surface;
    back projecting by the projector the defocus image captured by the at least one camera onto the three-dimensional surface; and
    fitting a two-dimensional Gaussian function onto a plurality of pixels of the defocus image to determine a defocus value for the plurality of pixels.

3. The method of claim 1, wherein the characteristic is a color intensity.

4. The method of claim 3, wherein adjusting the characteristic of the first and second image at the location of the discontinuous region comprises:
    comparing a pixel to a neighborhood of pixels projected onto the three dimensional surface; and
    weighting the pixel by a weight value corresponding to a smoothness value of a target image.

5. The method of claim 4, further comprising creating a blending map to blend the first input image and the second input image together at overlapping regions between the first input image and the second input image.

6. The method of claim 5, wherein pixels in the overlapping regions are weighted differently than pixels in non-overlapping regions.

7. The method of claim 1, further comprising scaling the first modified image and the second modified image based on a global scaling factor, wherein the global scaling factor is the smallest scaling factor that each pixel of the first modified image and the second modified image is produced without clipping.

8. A system for projecting visual content onto an object, comprising:
    a first projector;
    a second projector; and
    a processor, the processor configured to perform the following operations:

generate a generic defocus model for each the first projector and the second projector, wherein the defocus model models a defocus of each the first projector and the second projector for a working volume;

generate a generic light transport model for a material of the object;

analyze a three-dimensional mesh corresponding to the object to determine discontinuous projection depths;

adjust by a computer a first input image and a second input image to create a first modified image and a second modified image based on the generic defocus model of each of the two projectors, the generic light transport model, and a characteristic of the first input image and the second input image at a location of the discontinuous regions; and transmit the first modified image to the first projector and transmit the second modified image to the second projector for projection onto the object.

9. The system for projecting images of claim 8, wherein the generic defocus model and generic light transport model are independent of a scene geometry.

10. The system for projecting images of claim 8, wherein the first input image and the second input image correspond to a first frame of the content.

11. The system of claim 10, wherein the computer is further configured to adjust a second frame of the content using the generic defocus model of each of the two projectors and the generic light transport model.

\* \* \* \* \*